US008116620B2

(12) United States Patent  (10) Patent No.: US 8,116,620 B2
King  (45) Date of Patent: Feb. 14, 2012

(54) METHODS AND SYSTEMS TO PREPARE AND ACTIVATE A WIRELESS CAMERA FLASH BY RADIO

(76) Inventor: Kevin J. King, Maricopa, AZ (US)

( * ) Notice: Subject to any disclaimer, the term of this patent is extended or adjusted under 35 U.S.C. 154(b) by 153 days.

(21) Appl. No.: 12/501,393

(22) Filed: Jul. 10, 2009

(65) Prior Publication Data

US 2010/0008658 A1 Jan. 14, 2010

Related U.S. Application Data

(63) Continuation-in-part of application No. 12/284,629, filed on Sep. 24, 2008.

(60) Provisional application No. 61/079,789, filed on Jul. 10, 2008, provisional application No. 60/974,790, filed on Sep. 24, 2007.

(51) Int. Cl.
*G03B 17/00* (2006.01)

(52) U.S. Cl. .......................................... 396/56; 396/155

(58) Field of Classification Search .............. 396/56–59, 396/171
See application file for complete search history.

(56) References Cited

U.S. PATENT DOCUMENTS

| 5,283,610 | A  | * | 2/1994  | Sasaki ............................ 396/57 |
| 6,404,987 | B1 |   | 6/2002  | Fukui |
| 6,831,420 | B1 |   | 12/2004 | Tohyama |
| 6,987,931 | B2 | * | 1/2006  | Iwasaki ......................... 396/157 |
| 7,057,174 | B1 | * | 6/2006  | Hopper et al. ............. 250/338.4 |
| 7,698,526 | B2 | * | 4/2010  | Frank et al. .................... 711/170 |
| 7,885,533 | B2 | * | 2/2011  | Clark ............................ 396/198 |
| 2002/0009296 | A1 | * | 1/2002  | Shaper et al. ..................... 396/56 |
| 2002/0171741 | A1 | * | 11/2002 | Tonkin et al. ............. 348/211.3 |
| 2006/0203925 | A1 | * | 9/2006  | Pirooz et al. .................. 375/260 |
| 2007/0070206 | A1 |   | 3/2007  | Clark |
| 2007/0237510 | A1 |   | 10/2007 | Clark |
| 2008/0298792 | A1 | * | 12/2008 | Clark ............................... 396/56 |
| 2009/0015654 | A1 | * | 1/2009  | Hayashi ..................... 348/14.02 |
| 2009/0129765 | A1 | * | 5/2009  | King .............................. 396/56 |
| 2010/0008658 | A1 | * | 1/2010  | King .............................. 396/56 |
| 2010/0209089 | A1 | * | 8/2010  | King .............................. 396/56 |
| 2010/0316364 | A1 | * | 12/2010 | Clark .............................. 396/57 |

OTHER PUBLICATIONS

Texas Instruments Data Sheet for Radio Module CC1101, obtained from http://focus.ti.com/lit/ds/swrs061f/swrs061f.pdf on Feb. 3, 2011; see pp. 95-96 of Data Sheet for document history dating to Apr. 16, 2007.*

* cited by examiner

*Primary Examiner* — Clayton E Laballe
*Assistant Examiner* — Bret Adams

(57) ABSTRACT

Methods and systems to prepare and activate a wireless flash device may comprise a remote camera flash device comprising: a first radio communication device coupled to a camera, and at least a second radio communication device coupled to the remote camera flash device. The first radio communication device may transmit at least one radio signal to the second radio communication device in response to receiving camera communications sent from the camera, the second radio communication device sends pseudo camera communications to the remote camera flash device in response to receiving the at least one radio signal, and the second radio communication device does not transmit a radio signal.

20 Claims, 27 Drawing Sheets

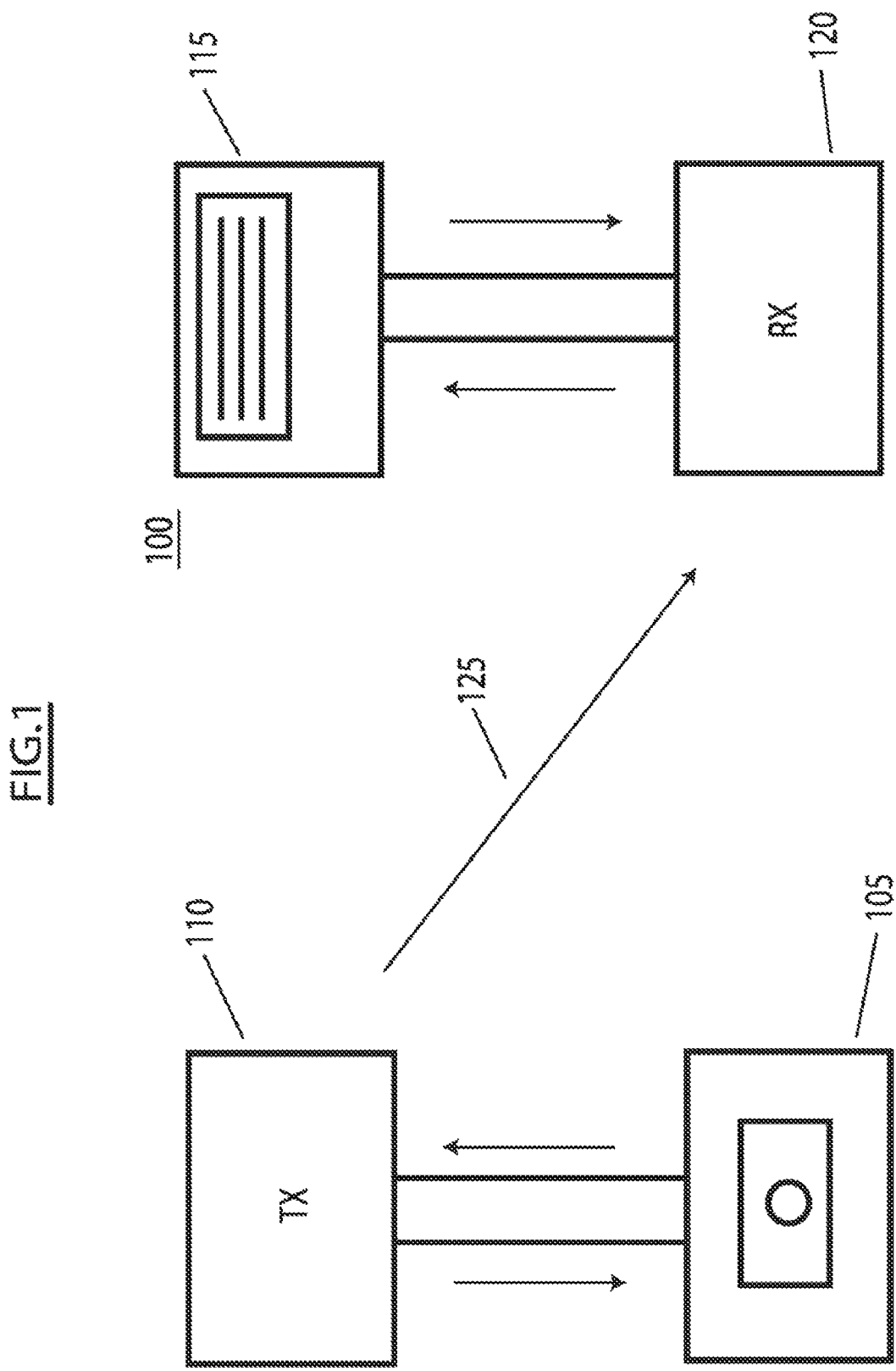

Hot Shoe Pin-Out

P1 = CLK - Clock from Camera
P2 = Data Out from Camera
P3 = Data In response from Flash
P4 = Proprietary Enable from Camera
X Sync = Shutter open Indicator
Ground = Side leafs and shoe itself

Modular Connectors

FIG. 9   Data Byte Format Diagram

FIG. 12  Main-Flash Communication

FIG.13

Handshake Data Packets

| Byte | Cam Send | Sync Reply |
|---|---|---|
| B1 | 1011 1101 | 1111 1111 |
| B2 | 0000 0000 | 1010 1010 |
| B3 | 0100 0110 | 0101 1001 |
| B4 | 0111 0100 | 0000 0000 |
| | | |
| B1 | 1011 1001 | 1111 1111 |
| B2 | 1000 0000 | 0000 0000 |
| B3 | 1111 1011 | 1000 1000 |
| B4 | 1111 1111 | 0000 0010 |
| B5 | 1111 1001 | 1000 1000 |
| B6 | 1111 1111 | 0101 0101 |
| B7 | 1111 0101 | 1000 1000 |
| B8 | 1111 1111 | 0111 0011 |
| B9 | 1111 1111 | 0100 0001 |
| B10 | 1111 1111 | 0001 0001 |

FIG.14

Steady State Data Packet

| Byte | Cam Send | Sync Reply |
|---|---|---|
| B1 | 1111 1111 | 1111 1111 |
| B2 | 1011 0101 | 1000 1000 |
| B3 | 0101 1100 | 1000 1000 |
| B4 | 1011 1001 | 1000 1000 |
| B5 | 1000 0000 | 0000 0000 |
| B6 | 1011 1101 | 1000 1000 |
| B7 | 0000 0000 | 0001 1000 |
| B8 | 0100 0110 | 0001 1000 |
| B9 | 1011 1011 | 0001 1000 |
| B10 | 0110 0000 | 1000 1000 |
| B11 | 1111 1111 | 1000 1000 |
| B12 | 1111 1011 | 1000 1000 |
| B13 | 1111 1111 | 0000 0010 |
| B14 | 1111 1001 | 1000 1000 |
| B15 | 1111 1111 | 0101 0101 |
| B16 | 1111 0101 | 1000 1000 |
| B17 | 1111 1111 | 0111 0011 |
| B18 | 1111 1111 | 0100 0001 |
| B19 | 1011 0011 | 0001 0001 |
| B20 | 0001 0010 | 0000 0000 |
| B21 | 0100 0111 | 0000 0000 |
| B22 | 0010 1011 | 0000 0000 |
| B23 | 1111 0101 | 0000 0000 |
| B24 | 1111 1111 | 0111 0011 |
| B25 | 1111 1111 | 0100 0001 |
| B26 | 1111 1111 | 0001 0001 |
| B27 | 1011 0111 | 1000 1000 |
| B28 | 0010 0000 | 1000 1000 |
| B29 | 1011 1000 | 1000 1000 |
| B30 | 1000 1000 | 1000 1000 |
| B31 | 1011 0100 | 1000 1000 |
| B32 | 0001 1101 | 1000 1000 |

FIG. 15

Transmit Side: Pre-Flash Data

| Byte | Cam Send | Sync Reply |
|---|---|---|
| B1 | 1111 1111 | 1111 1111 |
| B2 | 1011 0100 | 1000 1000 |
| B3 | 0000 0011 | 1000 1000 |
| B4 | 1111 0010 | 1111 1111 |
| B5 | 1111 1111 | 1010 0000 |
| B6 | 1011 0010 | 1000 1000 |
| B7 | 1010 0000 | 1000 1000 |
| B8 | 1010 0000 | 1000 1000 |
| B9 | 1010 0000 | 1000 1000 |
| B10 | 1011 0001 | 1000 1000 |
| B11 | 0000 0100 | 1000 1000 |
| B12 | 1011 0100 | 1000 1000 |
| B13 | 0010 0011 | 1000 1000 |

FIG. 16

Transmit Side: Main-Flash Data

| Byte | Cam Send | Sync Reply |
|---|---|---|
| B1 | 1111 1111 | 1000 1000 |
| B2 | 1011 0011 | 1000 1000 |
| B3 | 0011 0010 | 0000 0000 |
| B4 | 0100 0111 | 0000 0000 |
| B5 | 0010 1011 | 0000 0000 |
| B6 | 1111 1000 | 0000 0000 |
| B7 | 1111 1111 | 1111 1111 |
| B8 | 1011 0010 | 1000 1000 |
| B9 | 1111 1110 | 1000 1000 |
| B10 | 0000 0000 | 1000 1000 |
| B11 | 0000 0000 | 1000 1000 |
| B12 | 1011 0100 | 1000 1000 |
| B13 | 0001 1101 | 1000 1000 |
| B14 | 1111 0010 | 1111 1111 |
| B15 | 1111 1111 | 1100 0000 |
| B16 | 1011 0011 | 1000 1000 |
| B17 | 0011 0110 | 0000 0000 |
| B18 | 0100 0111 | 0000 0000 |
| B19 | 0010 1011 | 0000 0000 |
| B20 | 1011 0001 | 0000 0000 |
| B21 | 1011 0100 | 1000 1000 |
| B22 | 1011 0100 | 1000 1000 |
| B23 | 0011 1101 | 1000 1000 |

FIG. 17

Transmit: Optical Signal By Light Data, Bytes 1 and 2

| Byte | Blink Signal |
|---|---|
| B1 | 0011 0000 |
| B2 | 0111 1111 |

FIG. 18

Receive Side: Pre-Flash Data

| Byte | Cam Send | Sync Reply |
|---|---|---|
| B1 | 1111 1111 | 1000 0110 |
| B2 | 1011 0100 | 1000 0110 |
| B3 | 0000 0011 | 1000 0110 |
| B4 | 1111 0010 | 1000 0110 |
| B5 | 1111 1111 | 1010 0000 |
| B6 | 1011 0000 | 1000 0110 |
| B7 | 1010 0000 | 1000 0110 |
| B8 | 1011 0001 | 1000 0110 |
| B9 | 0000 0100 | 1000 0110 |
| B10 | 1011 0100 | 1000 0110 |
| B11 | 0010 0011 | 1000 0110 |

FIG. 19

Receive Side: Main-Flash Data

| Byte | Cam Send | Sync Reply |
|---|---|---|
| B1 | 1111 1111 | 1111 1111 |
| B2 | 1011 0011 | 1000 0110 |
| B3 | 0011 0010 | 0000 0000 |
| B4 | 0100 0111 | 0000 0000 |
| B5 | 0010 1011 | 0000 0000 |
| B6 | 1111 1111 | 0000 0000 |
| B7 | 1011 0000 | 0101 1111 |
| B8 | 0100 0000 | 1000 0110 |
| B9 | 0100 0000 | 1000 0110 |
| B10 | 1011 0100 | 1000 0110 |
| B11 | 001 1101 | 1000 0110 |
| B12 | 1111 0010 | 1000 0110 |
| B13 | 1111 1111 | 1100 0000 |
| B14 | 1011 0011 | 1000 0110 |
| B15 | 0011 0010 | 0000 0000 |
| B16 | 0100 0111 | 0000 0000 |
| B17 | 0010 1011 | 0000 0000 |
| B18 | 1011 0001 | 0000 0000 |
| B19 | 1011 0100 | 1000 0110 |
| B20 | 1011 0100 | 1000 0110 |
| B21 | 0011 1101 | 1000 0110 |

FIG. 20

Internal Radio Command Reference

Operational Software 1 "Canon 1D Series" Radio Commands

| Integer | Binary Bits | Command |
|---|---|---|
| 128 | 1000 0000 | Activate Flash: Full Emission |
| 129 | 1000 0001 | Activate Flash: Full Emission - 0.25F |
| ... | ... | Activate Flash: ... |
| ... | ... | Activate Flash: ... |
| 254 | 1111 1110 | Activate Flash: Full Emission - 15.50F |
| 255 | 1111 1111 | Activate Flash: Full Emission - 15.75F |
| | | |
| 1 | 0000 0001 | Initiate Communication - Flash Model 1 |
| 2 | 0000 0010 | Keep Alive Steady State Comm - Flash Model 1 |
| 3 | 0000 0011 | Order Pre-Flash - Flash Model 1 |
| 4 | 0000 0100 | Some Other Command for Flash Model 1 |
| ... | ... | |
| 19 | 0001 0011 | Commands 1 through 19 Reserved: Flash Model 1 |
| 20 | ... | Commands 20 through 39 Reserved: Flash Model 2 |
| ... | ... | |
| 39 | ... | |
| | | |
| 100 | | Commands 100 to 127 reserved for control |
| ... | ... | instructions to receiver, for example a command |
| 127 | | to change radio channels, or reboot into a different operational code block, or blink its display LED's, etc. |

Modular Software Design

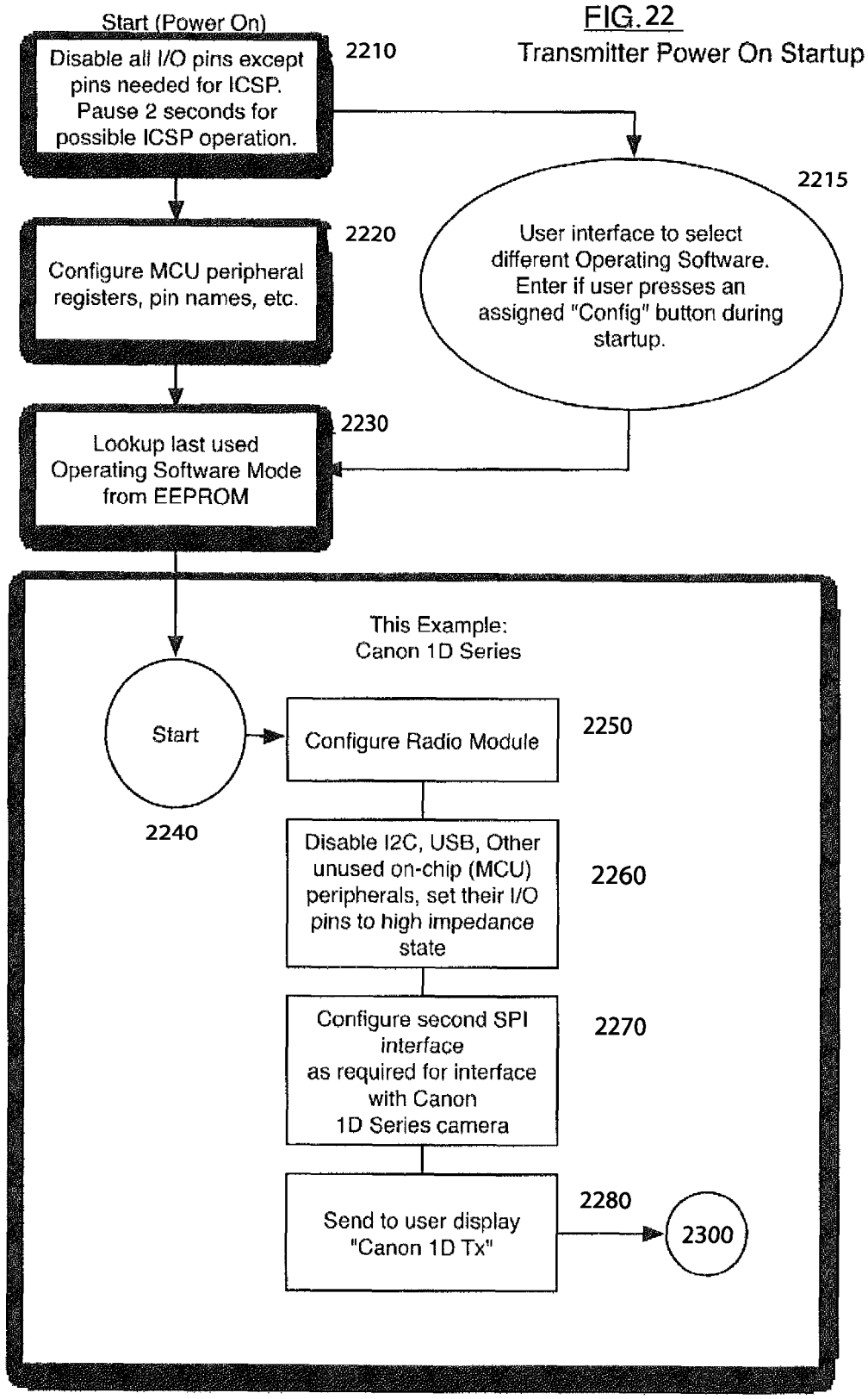

FIG. 23    Transmitter Main Routine
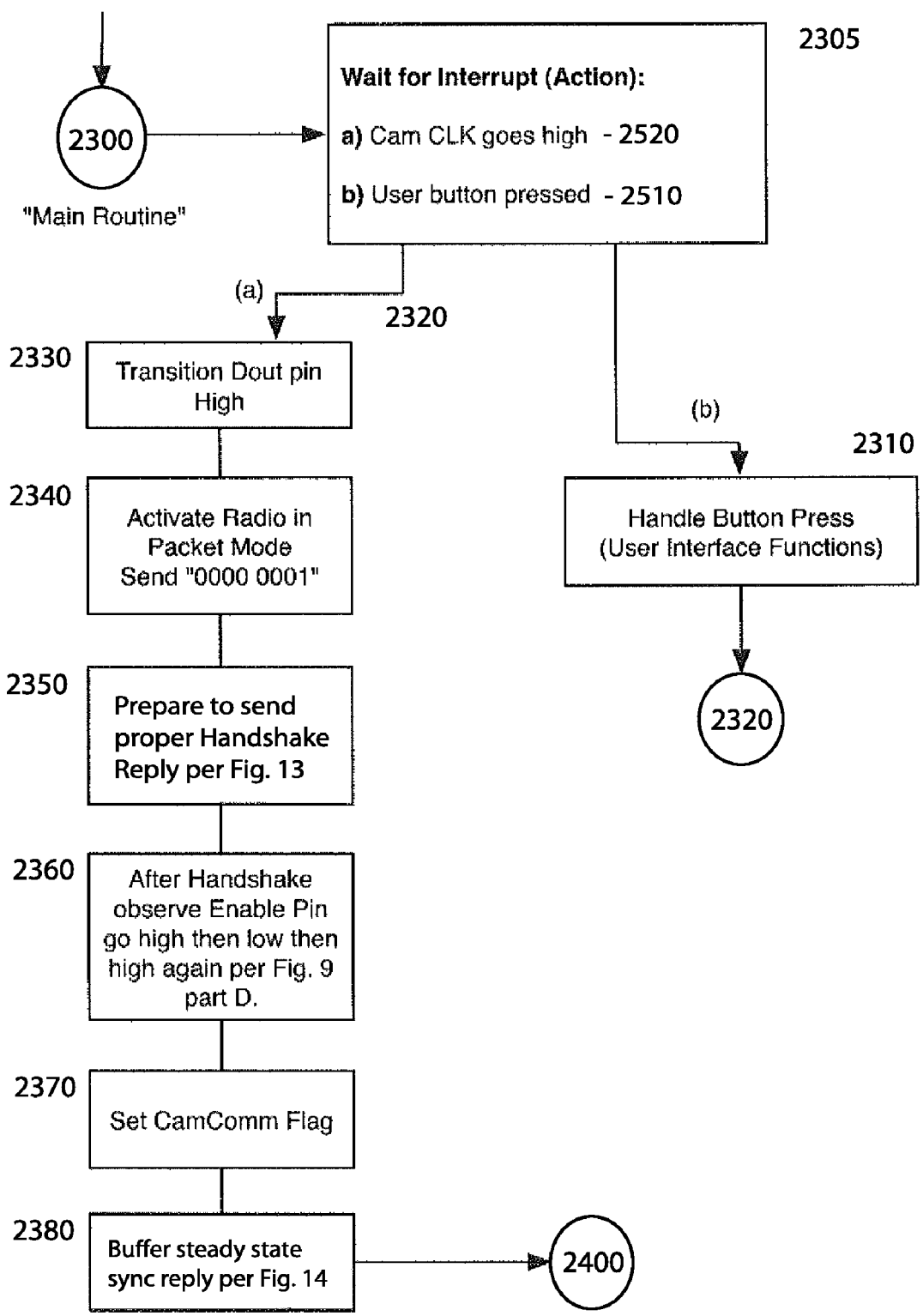

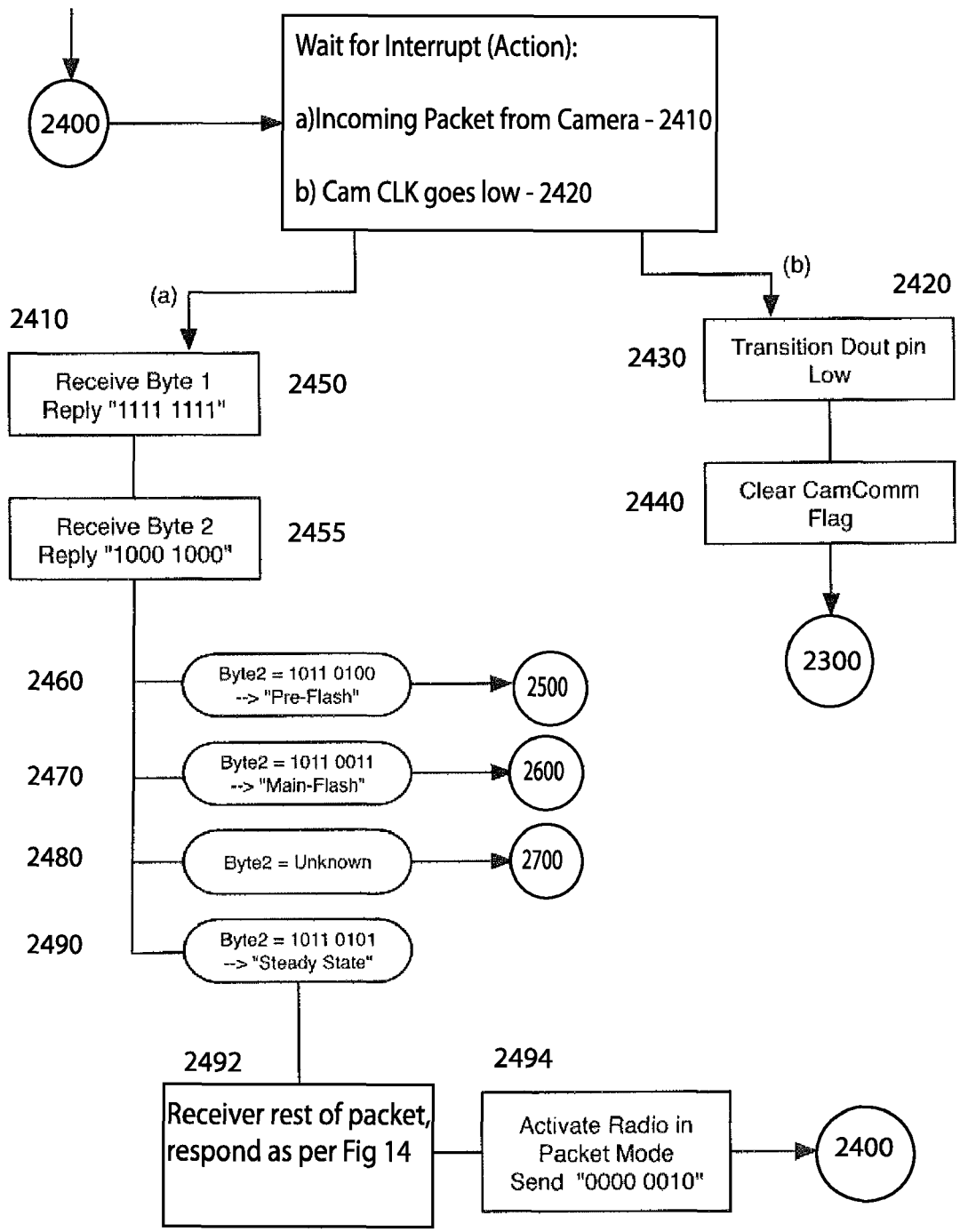
FIG. 24  Transmitter CamComm Routine

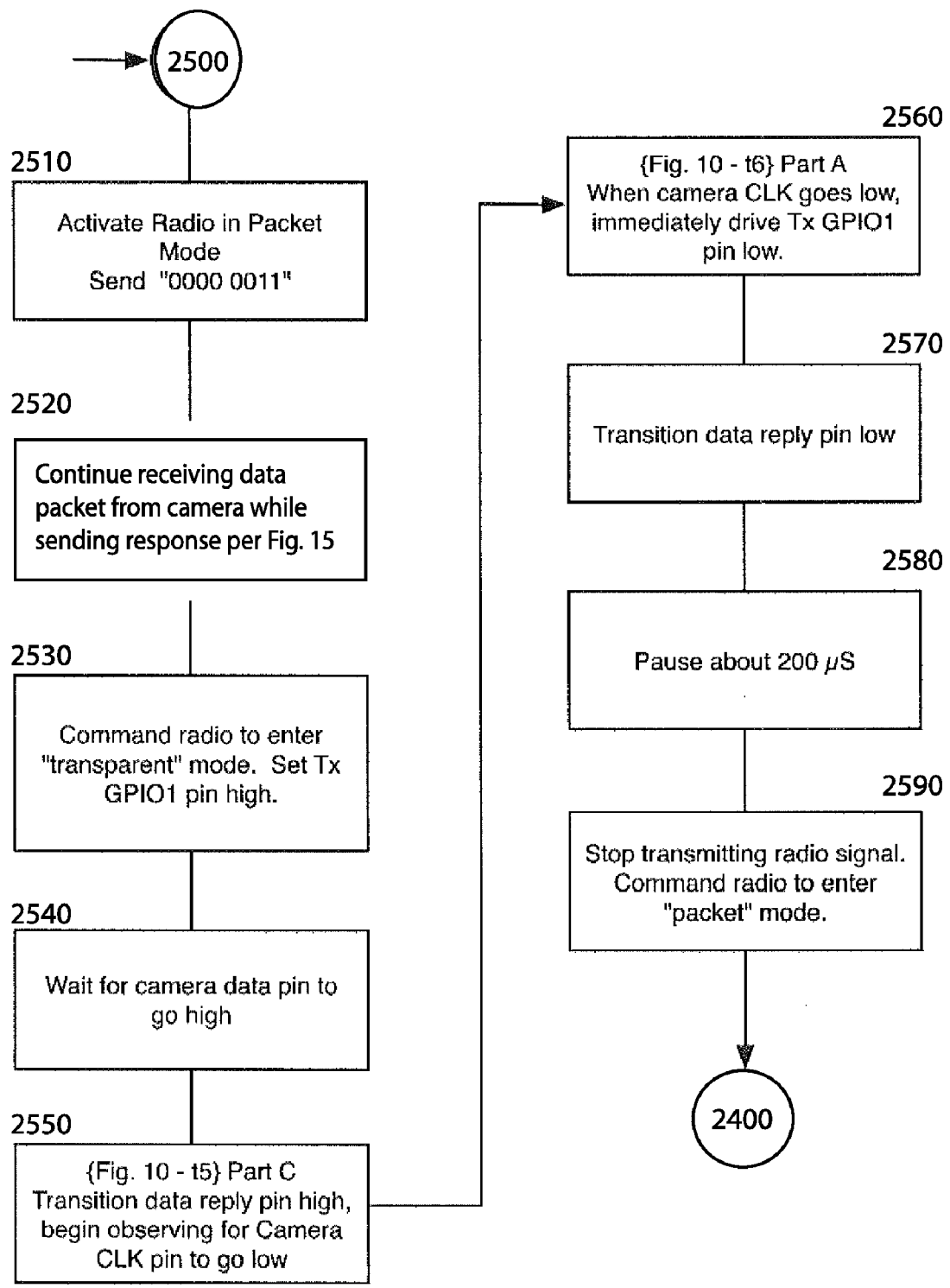

FIG. 26   Transmitter Main Flash Routine
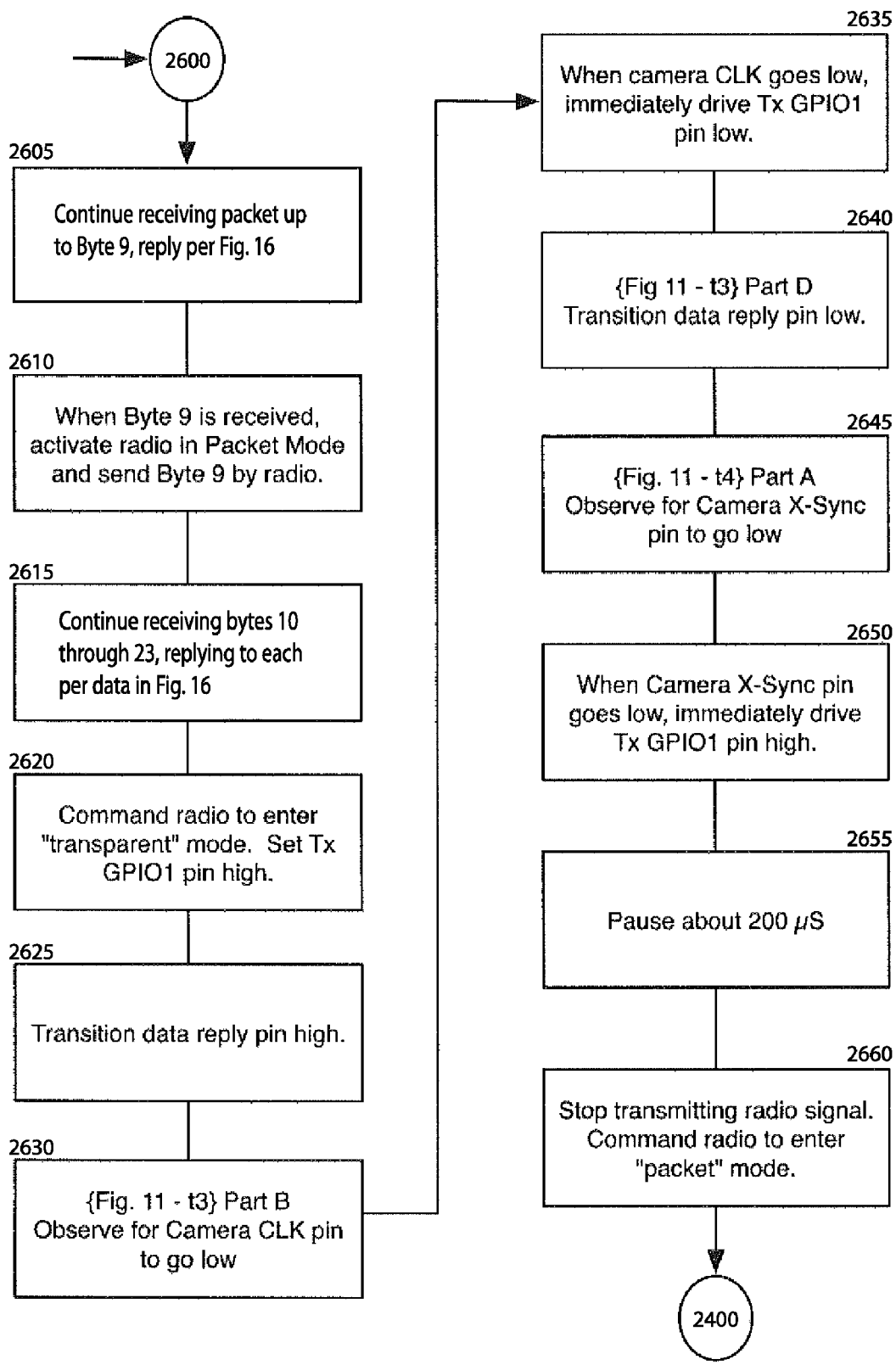

FIG. 27  Unknown Data Routine

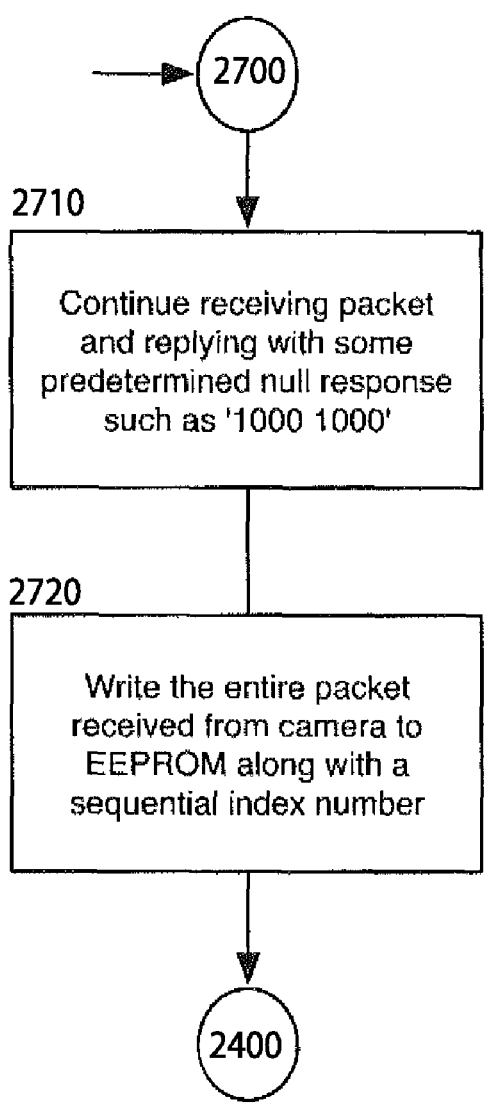

Unknown packet data is recorded to EEPROM where it can be easily retrieved by a troubleshooting function at some later time, or the entire contents of the EEPROM may be retrieved by another Operating Software program and sent via USB.

This makes it easy to discover new commands and find appropriate "null" responses to all communication expected to be handled when interfacing with a certain make and model of hardware.

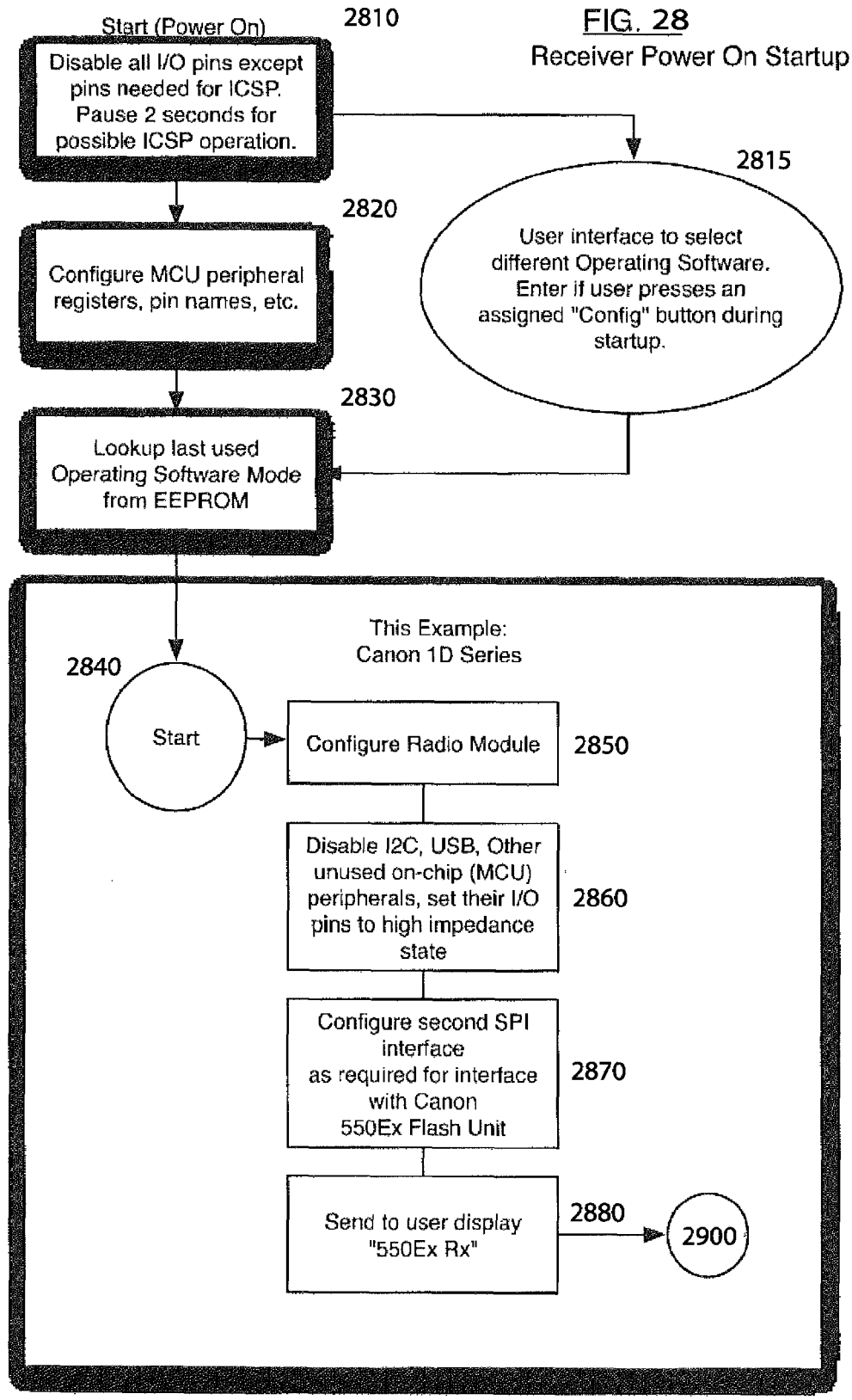

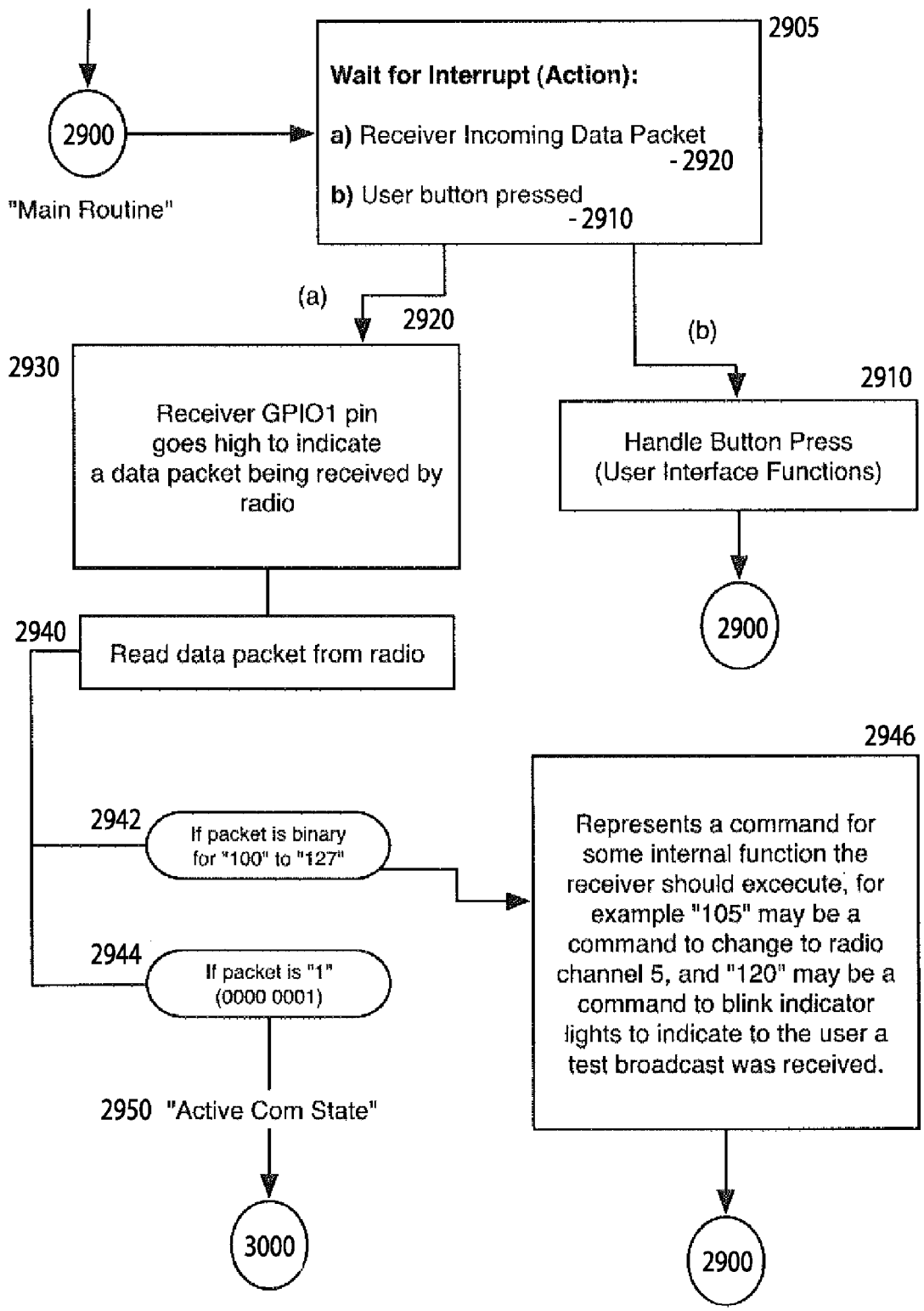
FIG. 29  Receiver Main Routine

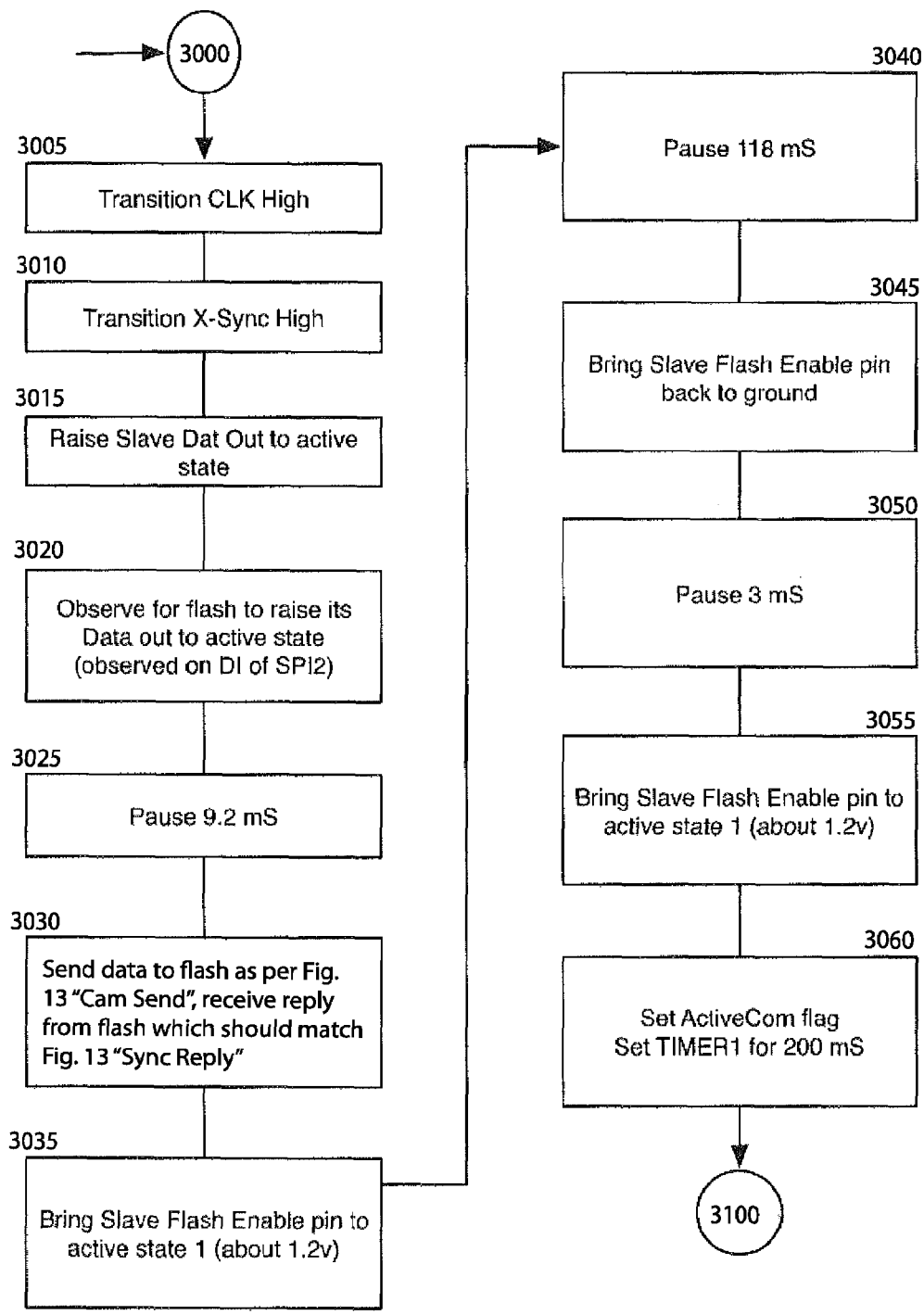
FIG. 30   Receiver ActiveCom Startup Routine

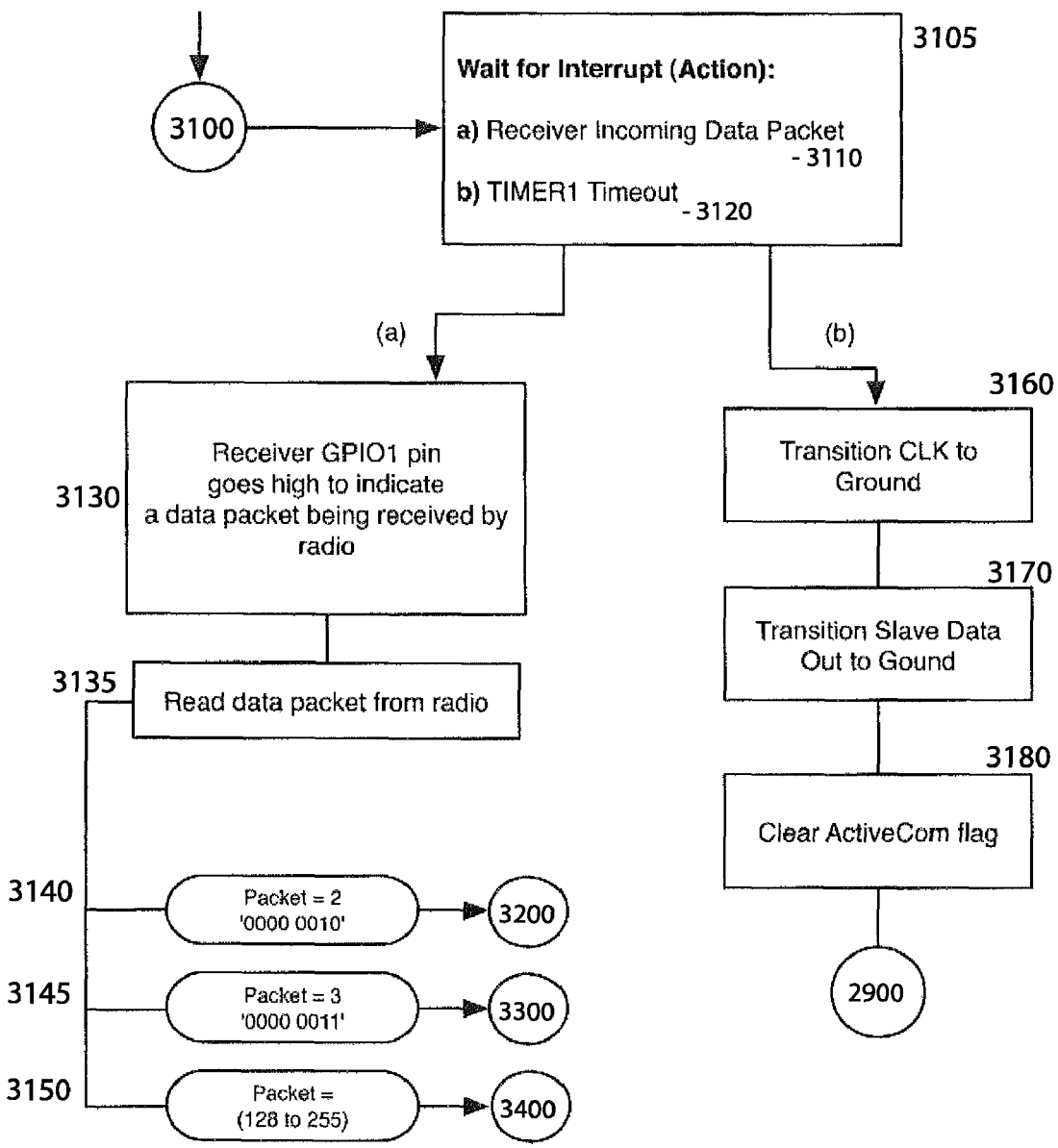

FIG. 32    Receiver Steady State Routine

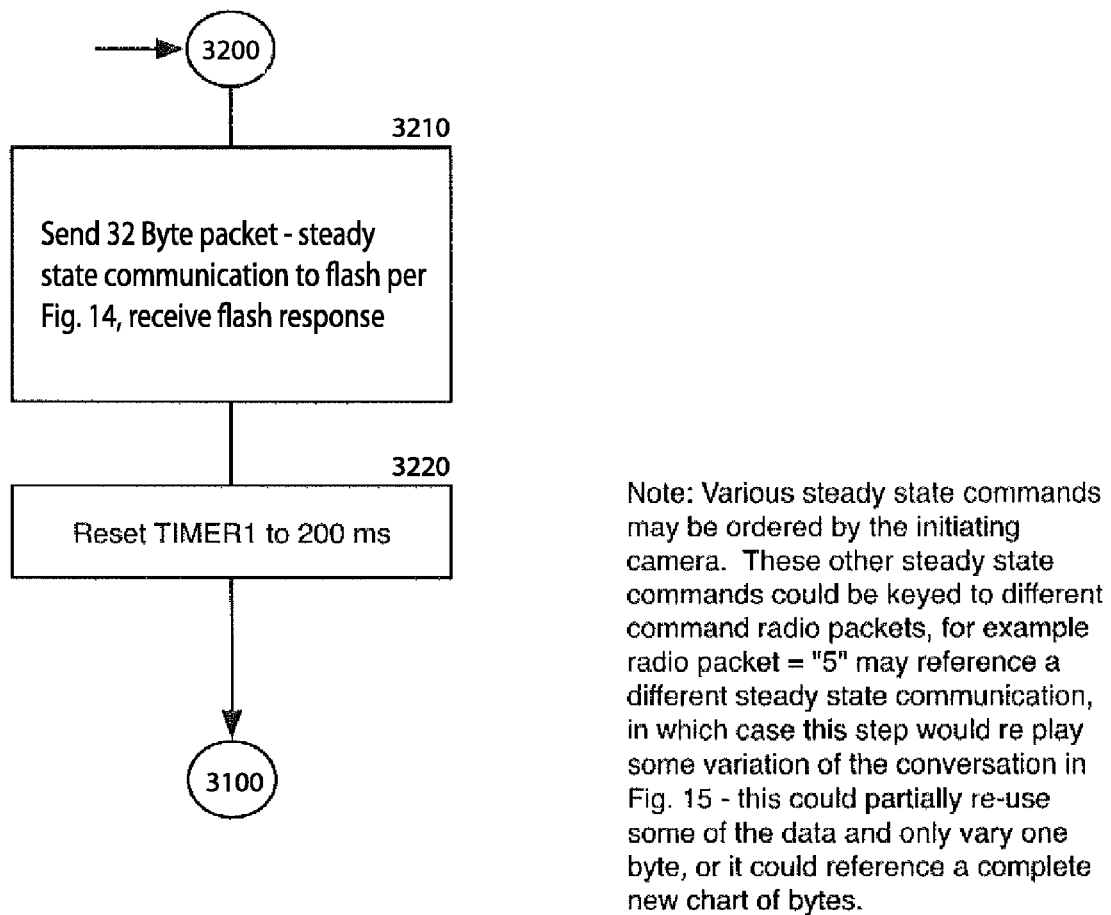

Note: Various steady state commands may be ordered by the initiating camera. These other steady state commands could be keyed to different command radio packets, for example radio packet = "5" may reference a different steady state communication, in which case this step would re play some variation of the conversation in Fig. 15 - this could partially re-use some of the data and only vary one byte, or it could reference a complete new chart of bytes.

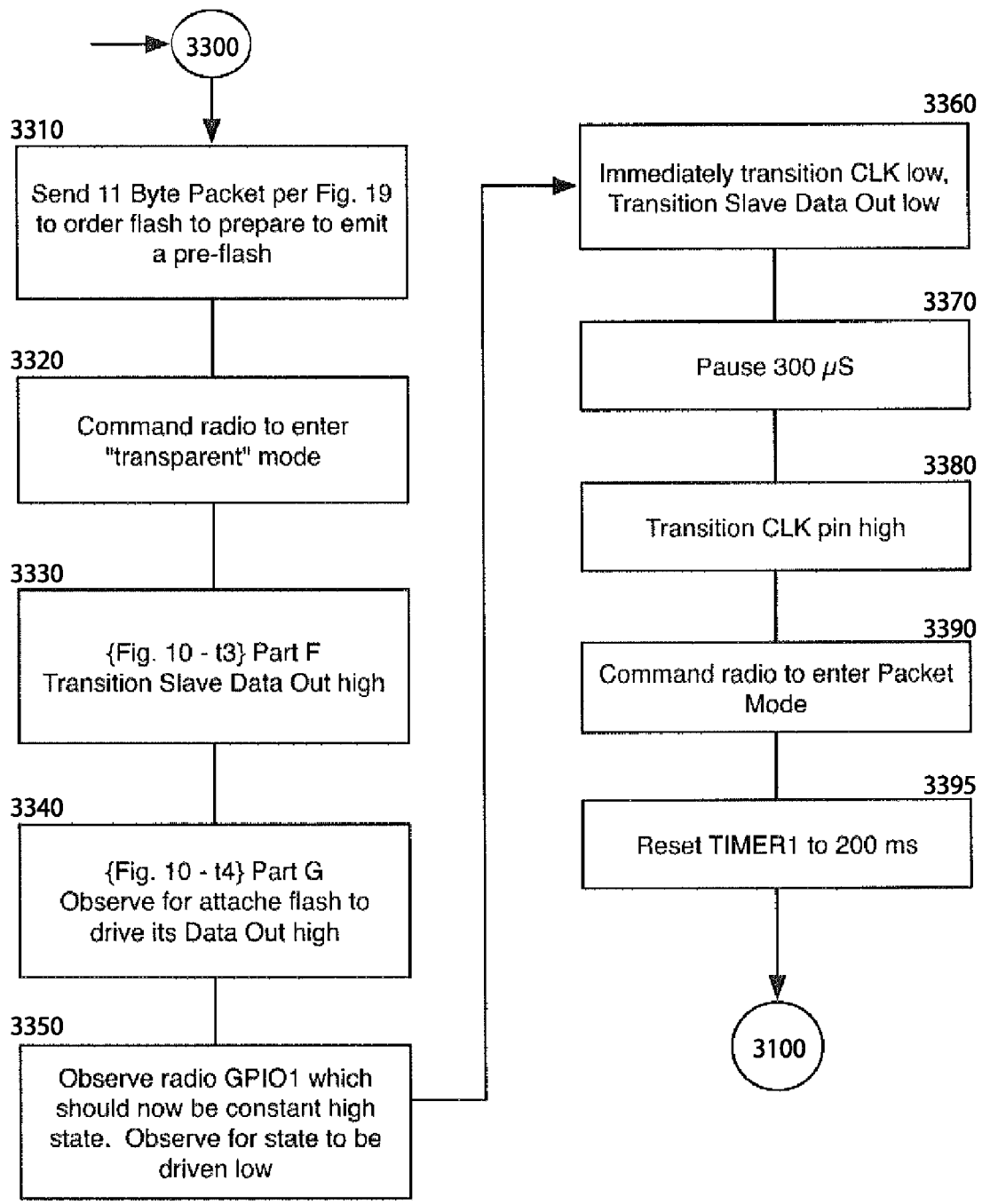
FIG. 33    Receiver Pre-Flash Routine

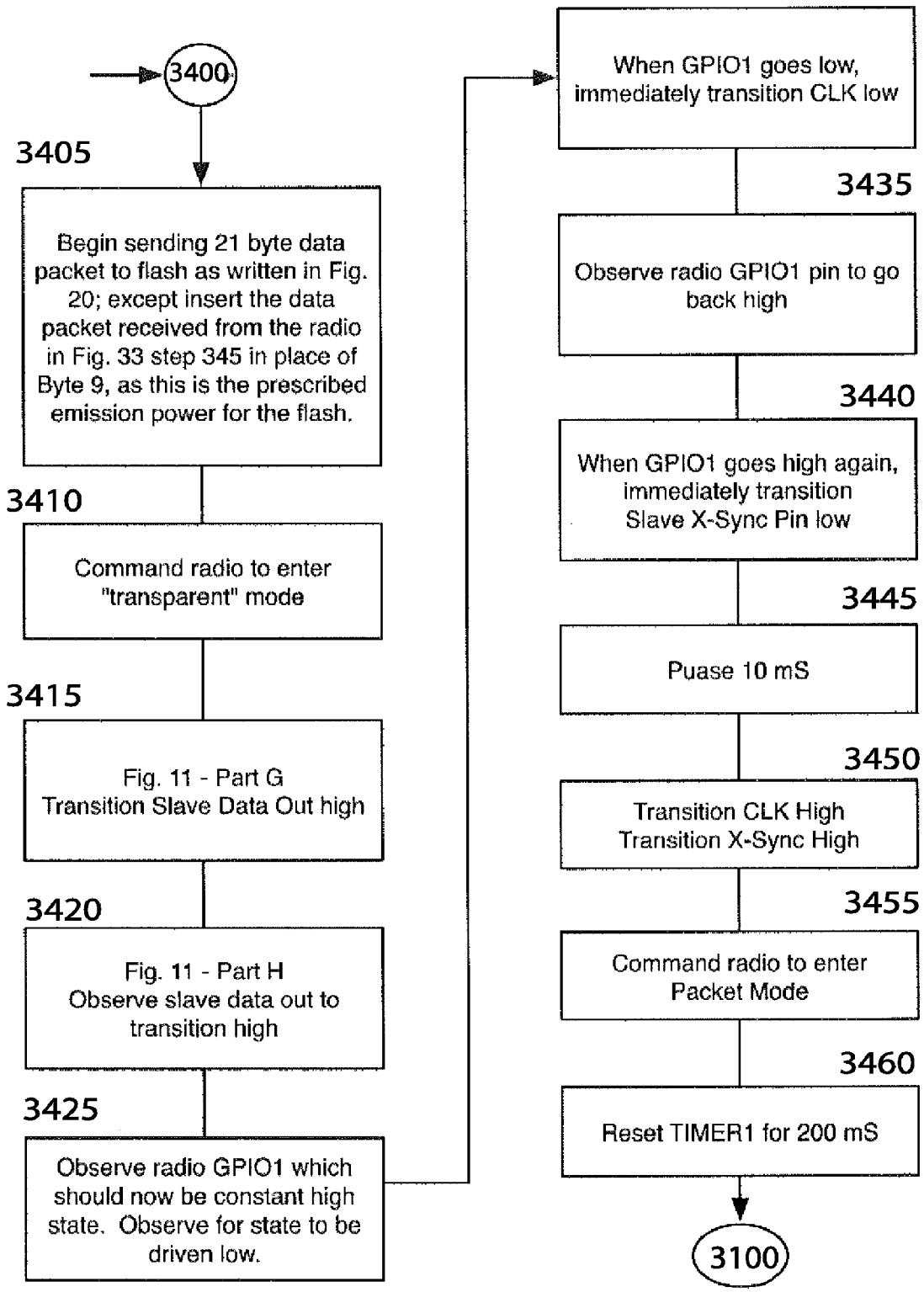

METHODS AND SYSTEMS TO PREPARE AND ACTIVATE A WIRELESS CAMERA FLASH BY RADIO

CROSS-REFERENCES TO RELATED APPLICATIONS

This application claims the benefit of U.S. Provisional Patent Application No. 61/079,789, tiled 10 Jul. 2008, and is a continuation-in part of U.S. Non-provisional patent application Ser. No. 12/284,629 filed 24 Sept. 2008, which claims priority to U.S. Provisional Application No. 60/974,790 filed 24 Sept. 2007, and incorporates the disclosure of such applications by reference.

SUMMARY OF THE INVENTION

In various representative aspects, the present invention includes a radio transmitter coupled to a camera and a radio receiver coupled to a flash device, which may be remote. In accordance with an exemplary embodiment, a system to wirelessly actuate a flash device may comprise: a first radio communication device coupled to a camera and at least a second radio communication device coupled to the remote flash device. Among exemplary embodiments, the first radio communication device may transmit at least one radio signal to the second radio communication device in response to receiving camera communications sent from the camera, the second radio communication device may send pseudo camera communications to the flash device in response to receiving the at least one radio signal from the first radio communication device, and the second radio communication device may not transmit a radio signal.

In an exemplary embodiment, the first radio communication device may comprise pseudo flash communications to send hack to the camera, which may be substantially similar to flash communications that the remote camera flash device comprises and sends back to the at least second radio communication device. Moreover, the pseudo camera communications sent to the remote camera flash device may be substantially similar to the camera communications that the camera sends to the first radio communication device In an exemplary embodiment, the camera communications may comprise of a plurality of unique data streams, wherein each of the plurality of unique data streams may comprise a data packet, and wherein each data packet may comprise a plurality of electronic bytes. The plurality of electronic bytes may be separated by time gaps.

In an exemplary embodiment, the first radio communication device may identify what type of the at least one radio signal to transmit to the at least second radio communication device by an identifiable byte from the plurality of electronic bytes in the data packet, and the identified radio signal may be transmitted to the at least second radio communication device during at least one of the time gaps.

In an exemplary embodiment, when the first radio communication device sends a unique pseudo flash communication from the pseudo flash communications back to the camera, the unique pseudo flash communication may correspond to a unique camera communication from the camera communications. Furthermore, the remote camera flash device may send a unique flash communication from the flash communications back to the at least second radio communication device, wherein the unique flash communication may correspond to the unique camera communication.

In an embodiment, the first radio communication device may comprise a radio transmitter and the at least second radio communication device may comprise a radio receiver.

In accordance with an exemplary embodiment, a method to simulate two-way serial communication between a camera, and a flash device coupled to the camera may comprise: coupling a radio transmitter having a first microprocessor to the camera; coupling a radio receiver having a second microprocessor to the flash device; receiving a first serial communication by the radio transmitter sent from the camera; transmitting an instruction signal from the radio transmitter to the radio receiver based upon the first serial communication; and sending a second serial communication to the flash device from the radio receiver that may be substantially similar to the first serial communication.

In accordance with yet another exemplary embodiment, a method to wirelessly actuate a remote flash device may comprise: coupling a first radio communication device to a camera; coupling a second radio communication device to the remote camera flash; receiving a camera communication by the first radio communication device from the camera; mimicking an electronic flash response from the first radio communication device to the camera based upon the camera communication; transmitting a radio signal from the first radio communication device to the second radio communication device based upon the camera communication; and mimicking the camera communication to the remote flash device by the second radio communication device.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 1 representatively illustrates a block diagram of an exemplary embodiment of the present invention;

FIGS. 13-19 representatively illustrate exemplary byte data packets that may be sent by the camera and correspondingly synchronously reply responses;

FIG. 20 representatively illustrates exemplary commands associated with a corresponding data packet;

FIGS. 22-34 representatively illustrate various operational flow charts in accordance with exemplary embodiments of the present invention.

Figure 3:
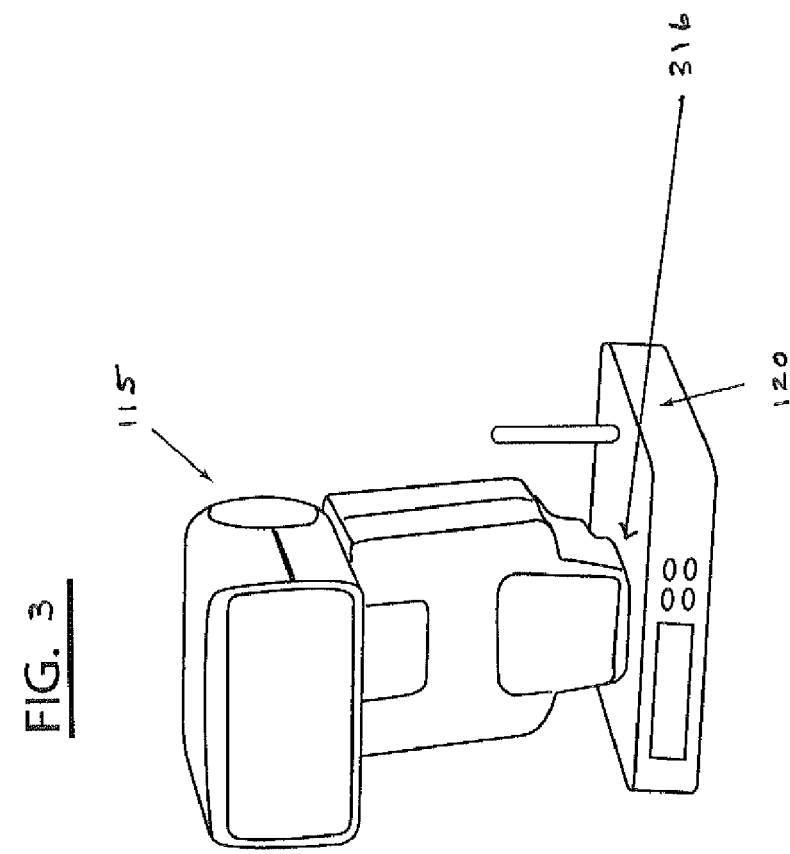
FIG. 3 representatively illustrates a perspective view of an exemplary radio receiver device coupled to a remote flash device.

Elements and steps in the figures may be illustrated for simplicity and clarity and have not necessarily been rendered according to any particular sequence. For example, steps that may be performed concurrently or in different order may be illustrated in the figures to help to improve understanding of embodiments of the present invention.

DETAILED DESCRIPTION OF EXEMPLARY EMBODIMENTS

Intro

The present invention may be described herein in terms of functional block components and various processing steps. Such functional blocks may be realized by any number of hardware or software components configured to perform the specified functions and achieve the various results. For example, the present invention may employ various cameras, flash devices, radio transmitters, radio receivers, as well as any software to provide functionality and interconnectivity between such cameras, flash devices, radio transmitters, and radio receivers.

In accordance with various exemplary embodiments, cameras for example, may comprise of any still and/or video graphic devices that may capture images in any manner, for example digitally, by film, or any other manner now known or developed in the future that may benefit from the present invention. The present invention may further employ various flash devices, for example, wireless flash devices, strobe light devices, synchronous flash devices, hardwired flash devices, etc. Exemplary flash devices may comprise a single flash device, a plurality of flash devices, coordinated flash devices, variable light frequency flash devices, integral flash devices, and the like. Exemplary flash devices may provide flashes comprising various intensity, duration, timing, color, etc. With respect to radio transmitters and radio receivers, the present invention may employ any now known or future developed transmitter/receiver components, and the radio transmitters and receivers may be configured to operate over a single radio frequency, multiple radio frequencies, as well as any other electromagnetic frequency outside of the typical "radio" band. The transmitter/receiver components may function on any one or combination of wavelength, wave type (square wave, s-wave, etc.), amplitude, modulation, period, power, range, and any other like electromagnetic wave characteristics. Moreover, the radio transmitters may also comprise radio receiving capabilities and similarly the radio receiver may also comprise radio transmission capabilities.

Thus, the various components may carry out a variety of functions, and in addition, the present invention may be practiced among any number of general environments, for example, still photography, video graphy, high speed photography, portrait imaging, landscape imaging, etc. The system described may be merely one exemplary application for the invention, and the present invention may employ any number of conventional techniques for coordinating a remote flash device and a camera.

Various representative implementations of the present invention may be applied to any system for a camera to communicate with a remote flash device. Turning now to FIG. 1, in accordance with an exemplary embodiment, the present invention may comprise a radio communication system 100 ("system") to allow a camera 105 to communicate to a flash device 115, which may be remote, in a manner that mimics and/or provides pseudo communication as if the camera 105 were directly coupled and/or hard wired to the flash device 115. To effectuate the communication between the camera 105 and the flash device 115, the system 100 may further comprise a transmitter 110 and a receiver 120, wherein in an embodiment the transmitter 110 and the receiver 120 may operate along typical "radio" band frequencies to communicate by radio waves 125. The transmitter 110 and the receiver 120 may be collectively referred to as "the devices," however; "the devices" may also comprise the camera 105, the flash device 115, and any combinations thereof. In accordance with an exemplary embodiment, the transmitter 110 may suitably couple to the camera 105 via a connector 206 (FIG. 2) to the camera's hot shoe 207, wherein the transmitter 110 may produce the radio waves 125 that may be received by the receiver 120. In accordance with an exemplary embodiment, the receiver 120 may comprise a "female" hot shoe connector 316 (more closely shown in FIG. 5), wherein the flash device 115 may operate as a "slave" flash device and may suitably couple to the receiver 120 in a similar manner as if the flash device 115 were normally coupled to the hot shoe 207 on the camera 105, but other connections may similarly be employed.

In accordance with an exemplary embodiment, either one or both of the transmitter 110 and the receiver 120 may comprise a radio module and a microprocessor, which may further comprise a suitably coupled memory device. Either one or both of the transmitter 110 and the receiver 120 may be powered by its own power source, such as a battery, but in other embodiments the transmitter 110 and/or the receiver 120 may draw power from the component to which it may be suitably coupled. The transmitter 110 and/or the receiver 120 may comprise of essentially hardware platforms that may be designed with software to carry out a variety of functions from, simple triggering operations to more complex proprietary operations such as Electronic Through The Lens ("ETTL") lighting commands by radio signal, wherein because radio signals, such as the radio waves 125 may be employed, no direct "line of sight" between the camera 105 and the remote flash device 115 may be needed.

Figure 21:
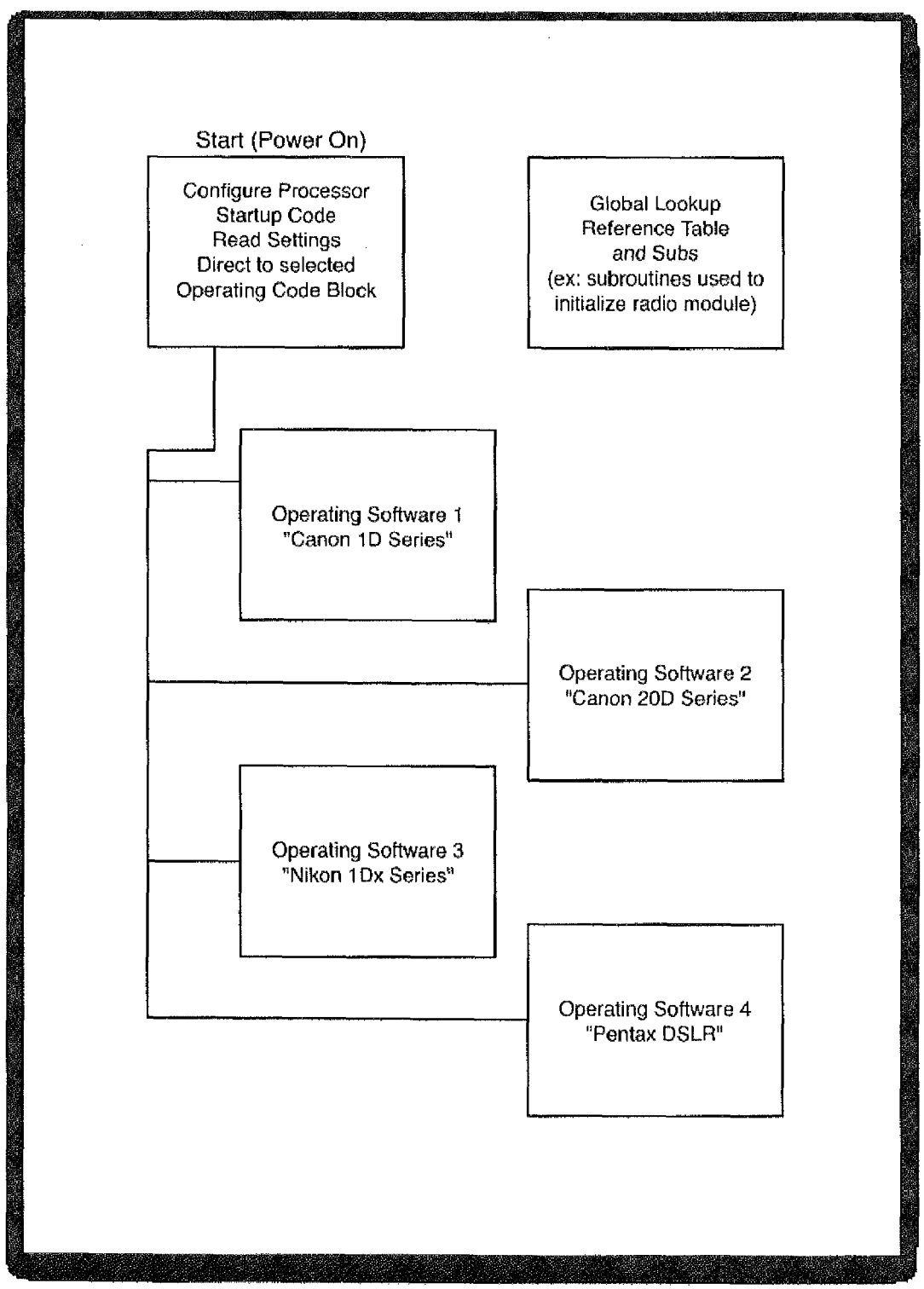
FIG. 21 representatively illustrates a block diagram showing various operating software associated with various exemplary cameras.

In accordance with an exemplary embodiment, and as will be discussed in greater detail, the software and logic included in either one or both of the transmitter 110 and the receiver 120 may be key to the present invention as they may allow various forms of the more sophisticated lighting control protocol ETTL. The transmitter 110 and the receiver 120 may also comprise a modular software framework, for example as shown in FIG. 21, to allow the devices (the transmitter 110 and the receiver 120) to comprise completely independent operating programs that may be interfaced with a variety of brands of cameras. For example, a Nikon® brand camera system may be employed to allow the complex operation of Nikon's® proprietary automatic lighting control protocol called "iTTL" somewhat similar to the ETTL logic of Canon® brand cameras.

Figure 2:
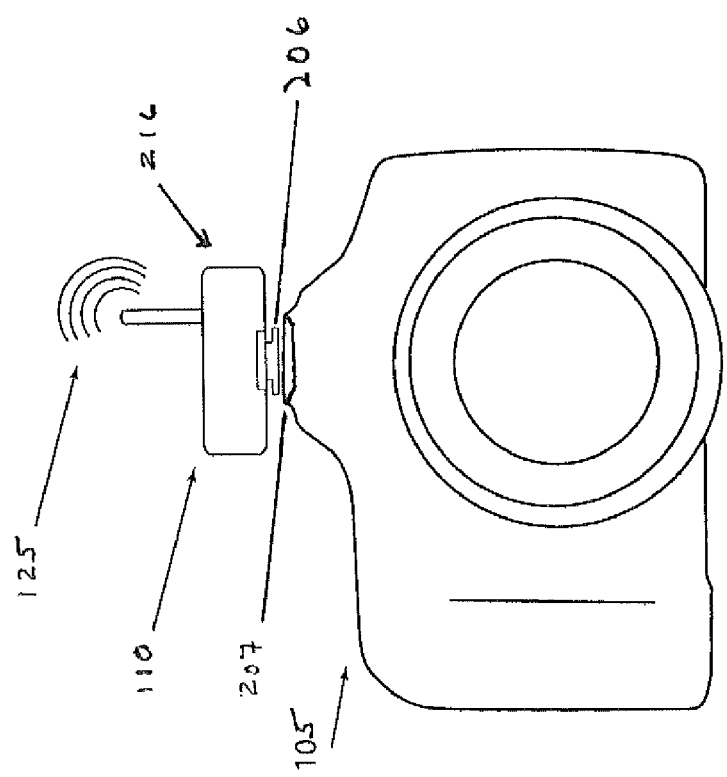
FIG. 2 representatively illustrates a front view of a camera coupled to an exemplary radio transmitter device.
Figure 4:
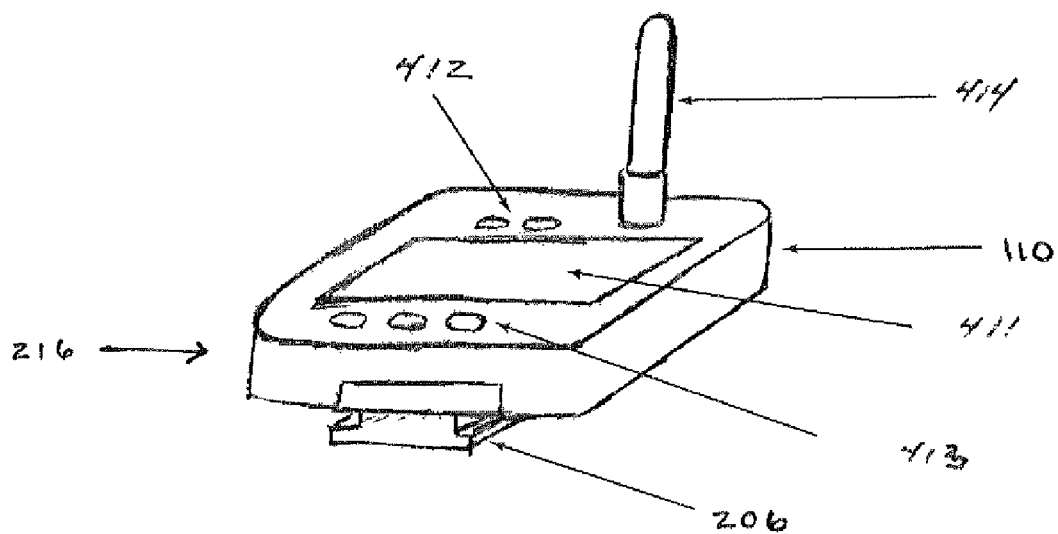
FIG. 4 representatively illustrates a perspective view of the radio transmitter device comprising various exemplary components.
Figure 7:
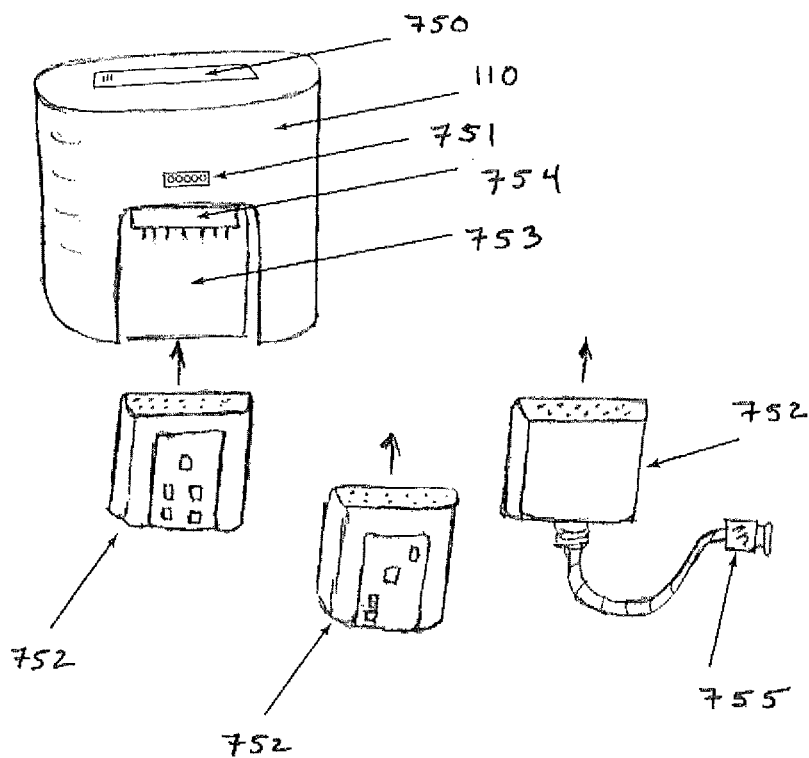
FIG. 7 representatively illustrates various modules that may couple to the radio transmitter device.

In accordance with an exemplary embodiment, the transmitter 110 as shown in FIGS. 2, 4, and 7 may comprise of an enclosure 216 that may comprise exterior access to various transmitter controls. For example, as shown in FIG. 4, various controls may comprise a display 411, indicator lights 412, operation switches (buttons) 413, as well as other controls. The transmitter 110 may comprise art interior comprising a circuit board, electronics, a battery power source (not shown), as well as other interior components. The transmitter 110 may also comprise an antenna 414 to emit a radio signal, e.g. the radio waves 125. With reference to FIG. 7, an exterior access 750 may be provided to access a battery compartment. Also, an In Serial Circuit Programming ("ICSP") connector 751 may be provided to facilitate programming operating software into a microprocessor, for example during a packaging process after manufacturing is complete. In an embodiment, an ICSP or a similar interlace, port, or peripheral function of a microprocessor may provide a manner by which a program or firmware may be loaded onto a microprocessor during packaging or shipping. Some manufacturers of microprocessors may further provide a similar port called a JTag, an ICE.

In accordance with an exemplary embodiment, a system of modular plugs 752 may allow for different "pin-out" arrangements of different hot shoes from different camera manufacturers for interchangeable use with a transmitter device, i.e. the transmitter 110. The modules 752 may fit into a recess 753 and may suitably couple to the transmitter 110 via a connector 754. When any of the modules 752 may be in place, the connector 754 may be completely covered, thus there may be no exposed electrical contacts during use. In an alternate embodiment, connectors other than hot shoe connectors may be used, for example a USB connector 755 may be used to connect to, for example, a studio lighting system, etc.

Figure 8:
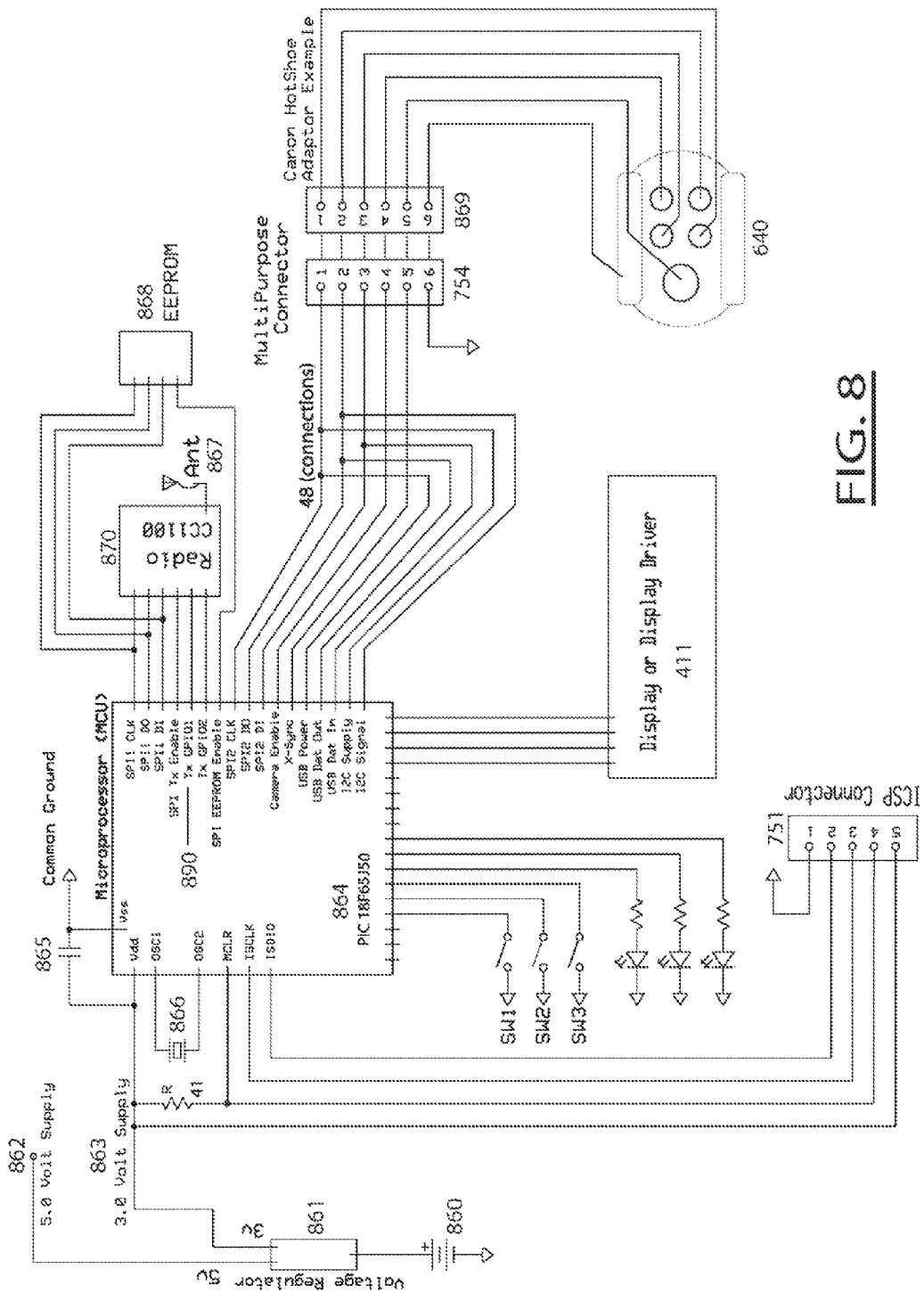
FIG. 8 representatively illustrates an electrical schematic diagram of a radio transmitter or radio receiver device.

In accordance with an exemplary embodiment, the transmitter 120 may comprise an internal circuit board, and the internal circuit board may be used as the physical base for the electrical couplings for the various components described. FIG. 8 representatively illustrates a schematic of an exemplary circuit board. Note the schematic shows exemplary components and respective signal lines, but the schematic may not show every electrical component that may be coupled to the circuit board. However, a person skilled in the art of circuit hoard design may update and/or alter the circuit board to include and add/delete components. Any components not shown by the schematic of FIG. 8 but which may be added to build an exemplify device, e.g. the transmitter 110 and/or the receiver 120, may build the device to include for example: inductors required by a power supply; capacitors and resistors to filter the power supply; ferrite beads to remove switching spikes from the power supply, decoupling capacitors on the microprocessor and radio, etc. Additional components may also comprise: a power supply 862 and/or 863, a ground 865 for a radio 870, an external EEPROM 868, a display 411, external components used in the output antenna design of the radio, as well as an external crystal oscillator used as a frequency reference by many types of radio modules.

In accordance with an exemplary embodiment and with continued reference to FIG. 8, the circuit board schematic shown may be not limited to such specific examples, and other configurations and circuit board architecture may be employed. For example, and in an embodiment, a battery 860 may couple to a voltage regulator 861 such as a voltage pump or switched supply. For size considerations, a small single cell battery such as a "AAA Battery" may be used, but such voltage (1.0 to 1.5 volts) may not be sufficient to drive the circuitry, thus the voltage regulator 861 may step up the voltage. For simplicity and cost savings, however, an alternate embodiment may comprise a standard "9-Volt Battery," in which case a simple step-down voltage regulator may be used. In accordance with an exemplary embodiment, any selected regulator may provide a 5.0 volt supply 862 as well as a 3.0 volt supply 863. The 3v supply may power most components, but the 5v voltage may be used to interface with some of the camera's logic, which may be based on the 5v logic system. Other regulators, voltage supplies, and the like may be employed.

In accordance with an exemplary embodiment, the circuit board may comprise a microprocessor ("MCU") 864, for example, a PIC 18F65J50 available from Microchip®, Inc. although any microprocessor comprising the desired peripheral features, speed, memory, and the like may also be used. The MCU 864 may comprise an 8-bit microprocessor having several peripheral features, wherein only some of the peripheral features may be used by the current exemplary embodiment, but should the occasion arise for additional peripheral features, the peripheral features may already be installed and available for use, for example via a software update. The MCU 864 may also comprise ample code space for future software growth and updates, as well as several, available input-output ("I/O") pins to allow for a flexible user interface design.

In an exemplary embodiment, external support components may also be provided for proper operation of the MCU 864. External support components may comprise, for example, a decoupling capacitor 865, an oscillator 866, and the like to facilitate the MCU 864 to operate in a fast and efficient manner, e.g., as quickly as 40 Mhz to provide, for example, a 10 million instruction per second ("MIP's") capability, for the high speed and timing interactions performed by the present invention.

The MCU 864 may also comprise separate Serial Peripheral Interfaces ("SPI's"). By comprising such SPI's, the MCU 864 may interact directly with a proprietary signaling protocol with a device such as the camera 105. Moreover, the MCU 864 may also interact with its own internal components, such as a radio module 867, an EEPROM 868, an LCD display, and the like which may use a separate SPI interface that may not interfere with the proprietary protocol and signals that may be present on the first SPI interface between the transmitter 110 and the camera 105.

Often, many devices may share a single SPI, or other serial types of interfaces such as 12C and the like, and generally these devices interface in an acceptable manner. However, the present invention may interlace with a camera, for example the camera 105, using a very controlled connection that might conflict with other devices, thus, the connection to the multi-connector 754 may use its own separate serial interlace. The MCU 864 may also expose additional features such as 12C serial interfaces and/or a USB controller. The pins for these interfaces may also wire to the multi-connector 754. Only one type of interface may be generally used at any given time for a given device and the software inside the MCU 864 will typically disable the non-used interfaces and set all the pins for the non-used interfaces to a high impedance "input" state and the software will disregard them. Thus the software may easily switch between the type of interlace required to communicate with whatever device may be attached to the multi-connector 754.

Figure 5:
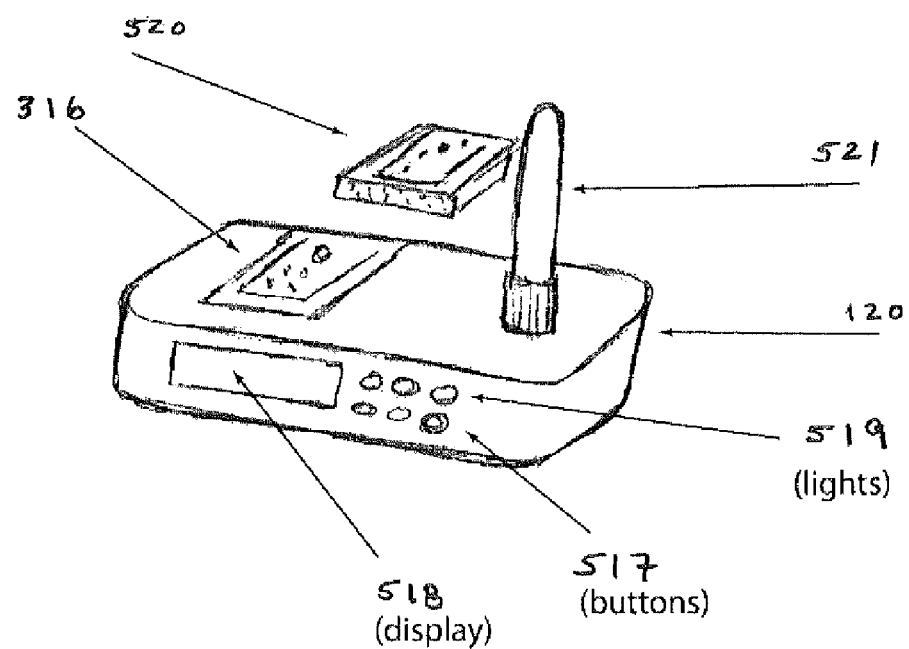
FIG. 5 representatively illustrates a perspective view of the radio receiver device comprising various exemplary components.

In accordance with an exemplary embodiment, the MCU 864 may also comprise ample I/O connectors for the user interface and supporting circuitry, to facilitate the operation of components, such as buttons 517, displays 518, and indicators 519 (FIG. 5). For example, the present, invention may comprise a multi-character LCD display because the output from such a display may be very flexible and provide an easy manner to interact with the user when setting operating parameters, however other displays and user signaling/interface mechanisms may be employed.

In an embodiment, the external EEPROM memory 868 may be provided which way use the primary SPI interlace with the MCU 864, also shared with the radio module 870. A suggested part may be the 25AA010A available from Microchip®, Inc., but any external EEPROM may be used. This EEPROM 868 may be used to secure a user's settings, a previously used operational code block, and/or to reference charts used by software to cross reference commands that may be encountered from the camera 105, referenced to the command the MCU 864 should carry out in response. Finally, the EEPROM 868 may log data packets to aid in troubleshooting and the discovery of how to interface with new commands between it and a given piece of hardware.

In accordance with an exemplary embodiment, connectors may be provided, such as the ICSP 751 as previously discussed, as well as the multi-purpose connector 754. Moreover, an adaptor for the given application may be used. Such an adaptor may comprise a connector 869 at a first end which may mate with the multi-purpose connector 754, and may wire the required pins to electrical contacts 640, which may interface directly with the pins expected to be found on a particular camera, hot shoe, data port, etc.

In accordance with an exemplary embodiment, a radio module 870 may allow radio signals, for example the radio waves 125, to be broadcast info the air. For example, a CC1100 component available from Texas Instruments® may be used, although other radio modules meeting similar specifications may be used. The CC1100 may be compact, low cost and provide a large offering of built-in features. Some of the built-in features may comprise the ability to packetize data or comprise a "transparent" mode where no packet logic may be used. The radio module 870 may broadcast whatever state may be indicated by an I/O pin, and it may further comprise settings that may be easily changed on the fly via the SPI interface. In an embodiment, configurable settings may comprise broadcast power level, frequency, and various encoding/keying modes such as Amplitude Shift Keying ("ASK")/On-Off Keying ("OOK") and Frequency Shift Keying ("FSK") based methods.

In accordance with an exemplary embodiment, various signal lines may be provided between the MCU's peripheral interfaces, I/O pins and the like. These I/O pins may use signals comprising different voltages normally provided by or used by certain types of hardware to which the present invention interfaces. Sometimes these voltages may go from a ground "low" state to a 5v "high" state, but in some embodiments, an intermediate state may be used. For example, perhaps a low of 2.5 volts and a high of 4 volts may be used, or maybe a pin such as a Canon® enable pin may have more than one discrete state to indicate various operations, for example 1.2 volts for "wake up" and 4 volts to signal "turn on the focus assist light", 5 volts to signal "make audible sound with a buzzer," etc.

In accordance with an exemplary embodiment, common methods to trigger various voltage levels described or to convert between, for example, 3v and 5v logic, may comprise using transistors as an I/O pin along with a voltage divider (using one or more resistors from supply to ground) to select different output states, to passive solutions using comparators and transistors, and/or to using stand alone Integrated Circuit ("IC") chips specifically designed to interface signals of different voltage levels. These passive components may be built into the modular connector 752 (FIG. 7), or 520 (FIG. 5) if only a specific model of hardware may be expected to need them. In accordance with various embodiments, to determine an appropriate signal voltage level, this may be found by observing the normal operation of the desired equipment on an oscilloscope by someone skilled in the art of circuit design prior to manufacturing the particular modular connector.

It should be noted that the transmitter 110 of the present invention generally does not include a high intensity light production means such as a xenon tube, thus the voltages included within the transmitter 110 may be much lower and safer, but, in other embodiments such high intensity light production means may be present. The transmitter 110 may be much less expensive to design and may not require as many testing or certification processes due to the lack of high voltage components. The transmitter 110 may also be made much smaller, comprising for example only a simple display 518 and a few input buttons 517, which may be created very small, thus it may be more convenient to use. The transmitter 110 may also use less power and uses smaller batteries due to the lack of a high intensity light production means that might typically be used to power a xenon tube.

In accordance with an exemplary embodiment of the present invention, the transmitter 110 may comprise a low power radio transmitting device, for example the radio module 870, which may operate on the international ISM radio bands. The transmitting frequency and output power of the radio module 870 may be adjusted by software commanded by the microprocessor 864. In this manner, the same physical unit (the transmitter, the radio module, and the like) may be easily adapted and certified for export to countries around the world with the only variation being the operating software, which may be loaded into the unit at the time of packaging and shipment.

In accordance with an exemplary embodiment, the receiver 120 of the present invention, in similar manner to the transmitter 110, may also not include a high intensity light production means (such as a high voltage xenon tube). The receiver 120 may also not comprise a fight sensor. The receiver 120 may receive command and control signals by a radio wave receiver, and may receive no commands or control signals via a light signal, although some embodiments may receive commands or control signals by such manner. Thus, the receiver 120 of the present invention may be smaller and less expensive for the same reasons as the transmitter 110. Additionally, the receiver 120 of the present invention may be easily moved to different remote "slave" camera flash devices where it might be compatible with future market units as well as providing an activation and control system that does not use an optical line of sight for current market units, for example Canon® brand models 550EX, 580EX, and/or 580EX11.

In accordance with exemplary embodiments of the present invention, the receiver 120 may be similar to the transmitter 110. The receiver 120, as shown in FIGS. 1, 3, and 5, may comprise of an exterior enclosure comprising, for example, user interface buttons 517, indicator lights 519, a display 518, and/or an antenna 521. The receiver 120 may also comprise its own version of a modular connector, such as connector 316, or shoe module 520, which may be used to interface with different hardware, usually camera flash devices. A similar recessed slot may accept the shoe modules 520. The exterior may also comprise, similarly to the transmitter 110, a battery compartment access, an ICSP connector, and lastly a ¼"-pitch female nut socket that may be used to accept a mounting connector from a light stand or tripod. Thus, a light stand (not shown) may couple to the underside of the receiver 120, and the camera flash device 115 may subsequently mount to the receiver 120. The nut may be recessed into the enclosure of the receiver 120 such that the under side may be flat and flush so that the receiver 120 may be positioned flat on a level surface when not attached, to a tripod or stand.

In accordance with an exemplary embodiment, a receiver 120 functional schematic may be substantially similar to that of the transmitter 110, although in an actual embodiment some minor changes may be made to the user interface, type of battery used, etc. As with the transmitter 110, the primary components of the receiver 120 may comprise an MCU, similar to the transmitter's MCU 864, an external EEPROM, similar to the transmitter's external EEPROM 868, a multi-purpose connector, similar to the transmitters multi-purpose connector 754, and a radio module similar to the transmitter's radio module 870. Moreover, any of the ancillary components described for the MCU and radio module for the transmitter 110 may also operate effectively for the receiver 120. In an embodiment, it should be noted that by using many of the same parts for both the transmitter 110 and the receiver 120, economies of scale may lower several of the manufacturing costs. Moreover, to even more effectively control costs, the suggested Texas Instruments® CC1100 radio module may be configured to both transmit or to receive signals.

In sum, both the transmitter 110 and die receiver 120 may comprise a "hardware platform" that may be up-gradable and provide functionality for future expansion of functions and features purely through the changing of modular connectors and software updates, which may be easily distributed by the internet and added to the device by the end user.

In accordance with an exemplary embodiment of the present invention, software may facilitate to control the logic of the system 100. In an embodiment, the aim may be to provide a modular software structure, for example as shown by FIG. 22, wherein when a device, such as the transmitter 110 and/or the receiver 120 "starts up," at least one "operating software" program may be run. Each software program may configure the devices in totally different ways. It may interface with and structure the data in the EEPROM differently, it may use the radio module in different modes for different uses, it may use different interface protocols to communicate with different types of hardware, etc. For example, one operating software program may provide ETTL communication between a camera and an advanced electronic flash unit, and another operating software program may interface via USB with a personal computer and output streams of recorded communication data or debugging information for use in the tuning and understanding of a protocol used to communicate with some new camera system.

In accordance with an embodiment, when the devices "power on," an operating program may be selected, or a previously used operating program may be resumed. All of the operating programs may call global reference tables or use subroutines of code blocks freely without necessarily requiring the duplication of redundant code. In accordance with various exemplary embodiments, either one or both of the transmitter 110 and the receiver 120 may comprise a similar modular software design.

In accordance with an exemplary embodiment of the present invention, a transmitter 110 may be suitably coupled to a camera 105, wherein the transmitter 110 may mimic the serial communication and signals sent by the flash device 115 to the camera 105 as if the flash device 115 were coupled to the camera 105. Furthermore, the camera 105 may function as if it were communicating to a coupled flash device, i.e. the flash device 115.

On the receiving end, a receiver 120 may be suitably coupled to the flash device 115 and may operate as if the flash device 115 were communicating to the camera 105, i.e. the receiver 120 of the present invention may mimic the communication of the camera 105. Thus, the camera 105 may, in effect, communicate with the remote flash device 115 as if the remote flash device 115 were suitably coupled to the camera 105; and the communication may be carried out using existing external connectors of the camera 105 and the flash device 115.

In an alternate embodiment, the communications may also occur using internal components, wherein the flash device 115 and/or the camera 105 may comprise internally inserted radio transmission devices, for example the radio module 870, that could be hard wired into the camera's circuitry that leads to the hot shoe at either end. In accordance with other exemplary embodiments, the communication may also be carried out with data connectors other than the hot shoe such as a motor drive plug, a USB connector, or any other connector that provides signals to or from the camera 105 and/or the flash device 115, as long as any communication signals may be understood and interfaced to carry out the various functions.

The communication itself may comprise several methods including simple signal lines going high or low, or being set at particular voltages at certain times, as well as comprising a serial data communication. The communication may comprise various timing parameters, such as a clock signal of a known value, as well as at least two lines used for the actual data, one incoming and one out going, thus a synchronous data communication may occur between the devices. However, other data communication configurations may be employed, for example an $I^2C$ RS-232, and the like, as well as others now known or developed in the future.

In accordance with the present invention, the entirety of the communication and/or the data transfer between the camera 105 and the flash device 115 may not be completely sent by a radio because the actual serial data "communication" between the camera 105 and the flash device 115 may be somewhat repetitive, and generally only a relatively small number of unique kinds of communications between the devices may actually occur. For example, a "handshake" between the devices may occur when the user "wakes" the devices by for example, by half pressing the camera 105 shutter button. Another communication may comprise a periodic "steady state" communication that continually updates the flash device of the camera's settings so that the flash device may show those settings in its user display (for example a chart showing the range that light will cast given the current f/stop dialed into the camera). In typical fashion, the flash device may synchronously respond at the same time with some of its own settings, as well as acknowledge (confirm) that it may be "hearing" the camera's communications. Yet another communication may occur merely before a "pre-flash" may be needed, and still yet another communication may occur before a "main flash" may be ordered by the camera 105, and still another communication right after a photograph may be taken, which may be a report from the camera 105 to the flash device 115 that the camera 105 recognized the light emitted during the photograph. In the latter, the flash device 115 may actuate a notification mechanism, for example an LED, to let the user know the flash device 115 fired properly.

A given conversation by and between the devices may be several bytes of information (8 bits per byte) which the camera 105 and flash device 115 exchange in a synchronous way, bi-directionally at the same time when directly coupled to one another. Thus, the challenge, which is solved by the present invention, is to effectuate a true bi-directional communication exchange in a uni-directional manner without modulation delays using a radio. One solution may be to use two radio units, one that sends and one that receives, using different frequencies at the same time. It may be possible to do this and certain exemplary embodiments may comprise such configurations, but there may be challenges in that implementation. A preferable process may comprise the use of a single radio that may be sporadically activated (not continually broadcast), wherein the communication exchanges between the devices may be accomplished in a manner that does not require simultaneous, bi-directional communication over the radio link. By such process, it will be easier to implement among actual settings, easier to certify into various countries of export, lower costs, and comprise only one radio link traversing one direction resulting in less chance of error during the radio data transmission process.

To provide some background to the standard process and thereby appreciate the present invention, a brief description of some of the communication as it currently exists may be helpful. For example, there may be multiple, but rather few, individual "conversations" a camera, such as the camera 105 may be likely to have with a flash, such as the flash device 115. Many of the conversations may comprise data that may not actually be necessary for the actual activation or control of the flash device 115. It may be easy to observe such communication occurring on a standard oscilloscope and note the characteristics of data that is sent (the actual bits of the bytes that make up the packet) by the camera 105 and the synchronous response from the flash device 115. These "conversations" may be short bursts of packets, usually no more than 32 bytes in length and they generally repeat in a predictable manner. Therefore, the actual amount of data required to be noted is in actuality relatively short.

One may assume that the meaning of all the exchanged data may need to be deciphered, but the present invention provides that in fact, all the data does not have to be deciphered. For example as shown by FIG. 13, a typical camera, such as the camera 105 may provide the "handshake" data stream ("Cam Send") of four bytes, for example bytes B1-B4, followed by ten bytes, for example bytes B1-B10, and a typical flash device, for example the flash device 115, may provide the synchronous response ("Sync Reply").

In this example, the camera 105 may be instructing the flash device 115 that it may be a camera, what model it may be, etc., and the flash device 115 may respond to the camera with something similar in response. If every time the camera "wakes up" the flash device, the same conversation occurs, which it generally does, then it may not be necessary to know what the conversation means, merely that the conversation occurs. Thus, all of this "handshaking" data may not need to be transmitted via the radio. Rather, all that is needed is a way to indicate to a receiving device, for example the receiver 120, that this particular conversation may be occurring, and about what time at which it may be occurring.

An instance where it may be desired to recognize and transfer actual data from the camera 105 to the flash device 115 may be during the actual picture taking. For example, a pre-flash operation typically emits the same amount of light, thus the conversation between the devices before the pre-flash may always be the same. That conversation may be approached in a similar manner to the handshake conversation above. However, the main flash, which is the one used to actually illuminate the subject during actual picture taking, may vary from shot to shot, thus a unique process is employed.

With reference to FIG. 16, an example of a typical main flash data transmission is observed. It should be noted that transmissions, communications, and/or conversations as discussed generally refer to a pattern and/or series of bytes (binary code), however any other manner to effectively transmit, communicate, and/or converse may be employed by the present invention. To continue, if one were to observe the conversation on an oscilloscope, a packet of 23 bytes may be recognized. Somewhere in that 23 bytes must be the data that instructs the flash device what amount of light to emit. If the ambient lighting is adjusted, so that the flash output power must change, and without changing any of the camera's other controls and observing, the same 23 bytes again, then by comparing the bytes that change which would obviously correspond to the light emission data, the pertinent information can be identified. In this example, it is clearly byte 9, as that is the only byte that changed from the first test to the second test. Thus, byte 9, an 8-bit number comprising a possible value from 0 to 255 is the instruction as to how much light to emit during a main flash. Since the rest of the conversation doesn't change, all that essentially needs to be communicated to a receiver may be the portion of the conversation, that did change, i.e. a single 8 bit number—one byte. Upon further investigation, such as by referencing available published information, we recognize that the light emission power data may be actually published, wherein such publication reveals that a value between 128 and 255 may be possible.

In accordance with an exemplary embodiment of the present invention, the various types of conversations the devices are having, along with the content of the conversation on the sending side and the reply of the conversation on the receiving side for a given camera and flash system may be viewed by an oscilloscope and recorded. Subsequently, the transmitter 110 may then be loaded with a table in its MCU, for example the MCU 864, or stored on its EEPROM, for example the EEPROM 868, which includes the likely communication from the camera, as well as its expected response if it were a flash. Each "conversation" may be indexed with a number between 1 and 255 that can be referenced by a single binary byte of information.

In an alternate embodiment, it may also be possible to index a number, using a partial byte, a longer byte, or a plurality of bytes. For example, a possible three commands/conversations and five power levels could be referenced by a total of 8 commands or values, requiring only three bits of information to represent those 8 possible commands or values. Similarly, it may be possible to reference a total of more than 128 commands and 128 power values by sending by radio a 10 bit byte, which would allow for a total of 1023 total commands or values, or sending by radio a 12 bit byte, which would allow for a total of 4095 total commands or values, etc. Similarly, a sequence of two eight bit bytes (for a total of 16 bits), could be used together to represent a total of 65,535 total commands or values, or similarly, even more additional bytes may be sent to represent even more commands or values.

In accordance with an exemplary embodiment, it may also be possible to embody the commands or values described using various alternate arrangements of bits or bytes which may be sent in a sequence of one or more packets by radio. For example, a first byte in a packet may comprise a payload of two bytes that may represent up to 255 different commands or "conversations" of a camera device, and the second byte of the payload may represent a value between 0 and 255 which may be used as an argument or other data when used with the first byte, for example to communicate a light emission power level desired by the flash device. Moreover, additional bytes may be sent to represent still more possible commands, conversations, alterations of commands or conversations, commands or conversations requiring various arguments as values, etc.

In a similar manner, all the conversations between a camera and a flash device in a non-wireless mode may be observed. These conversations may also be placed in a reference sable inside the receiver's MCU or EEPROM and may be indexed with the same number given to the similar conversation on the transmitter 110. Through observation of the data packets sent between the camera 105 and the camera flash device 115 by trial and error, other commands may also be discovered and implemented by any available unused keyed radio commands In accordance with an exemplary embodiment, during actual operation it may be possible for the transmitter 110 to allow the camera 105 to begin a conversation, and begin providing the expected responses, or any set of responses to which the camera 105 does not issue an error, terminate the conversation, or stop working in some way, in a true synchronous serial "real time" way that doesn't involve any radio delays. When enough of that conversation has elapsed, usually by the 2nd or 3rd byte of the packet, the MCU in the transmitter 110 may be able to single out the bytes thus far that belong to a single specific conversation. That MCU may then, between the current byte and the subsequent byte, normally over 100 microseconds, use it's SPI interface to send the index number for that particular conversation to an attached radio module, for example the radio module 870, then return to listening to the remaining bytes and providing the appropriate synchronous response bytes.

In an alternate embodiment, an SPI interlace may also be used to send a byte or bytes to a radio module at the same time that a byte is read from the camera 105 by a peripheral of the microprocessor using a buffer. For example, a peripheral such as a first SPI interface may be used to receive and transmit bytes to and from the camera 105, while a second SPI interface may be used to send bytes to transmit by radio to a radio module. It is possible to execute the sending of the byte or bytes to be transmitted to the radio module from the second SPI interface while at the same time, the first SPI interlace may automatically receive a byte from the camera 105, and store that byte in a buffer. Program execution of the microprocessor may then return after sending the byte or bytes to the radio to read from the buffer of the first SPI interface which is now holding the received byte from the camera 105, the program execution of the microprocessor may then use, analyze, etc the byte from the camera 105.

In accordance with an exemplary embodiment, the radio module may comprise its own capability to encapsulate that byte of data as "payload" into a larger radio packet comprising a preamble, a channel identifier, and other overhead bits used to distinguish the radio packet, then broadcast that packet into the air using ASK or FSK types of modulation. In an embodiment, the radio module may actively broadcast during the time of sending this one packet then cease broadcasting a signal.

On the receiving end, the radio module inside the receiver 120 "hears" the carrier preamble from the transmitter 110 and the channel identifier to qualify the incoming data and listens to the data packet and demodulates or "un-packs" the payload data byte. The receiving radio module then signals its MCU to which it may be wired that it has a waiting data byte by raising an I/O pin's state which triggers an interrupt in the MCU. The MCU may then initiate its SPI interface and transfer the byte of payload data from the receiver radio module and subsequently use that byte of data.

It should be rioted that the serial communication from the camera to the transmitter comprises about 1.6 milliseconds, 1600 microseconds, to transfer 4 bytes, for example as in the first fraction of the hand-shake communication shown by FIG. 13. A single 8-bit command by radio may be much faster. In fact, the radio transmission rate may be slowed down, perhaps even lower than 56,000 bits per second, which may greatly reduce possible error rate and also increasing usable range.

To continue, the receiver 120 may next take that byte of data and reference the byte to its own lookup table which may indicate a particular "conversation," a string of bytes including bits in each that should be strung together in a packet. The receiver 120 may then initiate a conversation using a separate serial interface with the coupled flash device 115, as if it were the camera 105, and have the same conversation with the coupled flash device 115.

In this manner, the exact timing of when the conversation occurs is not dispositive. The conversation on the receiving end may occur at very near the same time as the conversation on the transmitting end. The receiving end conversation will begin at some time following the initiation of the conversation on the transmitting side but not long after. The delay will be substantially equal to the time to transmit the first couple bytes on the transmit side (enough to recognize the unique conversation happening) and the time required for the radio to pack up the payload byte and send it. In an exemplary embodiment, the radio modules used may ran at 250,000 bits per second, so this entire lag may be measurable, but insignificant for the purpose of the data portion of the communication.

When a main flash is requested, the actual light for the photograph, instead of sending a keyed instruction as described, the actual byte 9 may be sent. Since this byte may be outside the range of the other keyed commands known to the receiver 120, e.g. bytes 1 to 127 on the receiver 120. The fact that the byte is out of range may be an indicator to the receiver 120 to begin the "main flash" communication and that the actual value should be inserted as the value used for byte 9 when performing the serial communication with the attached flash device 115.

This may be a simple and reliable way to indicate what data from a transmitter 110 to a receiver 120 should be used in a conversation, without having to relay and possibly corrupt an entire data stream. Unfortunately, this process may not work to send the signal to actually begin to emit light. That signal can be time critical and the time period to pack up data and send by radio as a packet may introduce too much delay; the receiving flash may activate too late to sync with the camera's open shutter, or in the case of the pre-flash, activate too late for the camera's metering system to accurately measure the light.

In accordance with the present invention, a separate process may use two different types of radio transmission. Both types of radio transmissions may be on the same frequency, but how the radio may be used throughout the process may change. As described above, the radio may sends "packets" of bits to key the various conversations occurring, but during an event such as a pre-flash emission the process as described for general conversations may change. The pre-flash conversation key may be sent by packet radio as described, but then the transmitter may switch the radio mode to a "transparent" mode. The transparent mode disables the packet hardware and instead allows an I/O pin on the radio module, for example as shown in FIG. 8 pin GPIO1 890, to directly drive the carrier of the radio. If the pin is forced high, by the attached MCU 864, the radio broadcasts a carrier at the prescribed frequency, and when it may be driven low, it stops broadcasting; this may be true with ASK/OOK modulation. Using FSK modulation, the state of the input pin may drive to a particular side of the radio transmission of the tuned frequency. Using either method, though, the result may be that on the receiving side, wherein the receiver may be also in this "transparent" mode, an output pin may be driven high or low in response to the signal. Thus, a high input on the transmitter 110 may result in a high output on the receiver 120 and vice versa. Consequently, the change of state can occur quite quickly, usually under 10 microseconds, because little or no time may be used for handling the overhead of a packetizing system.

This transparent mode may be entered before the light emission trigger instruction may be given by the camera 105. The radio begins to transmit a carrier and holds the state of the transmission. The transmitter 110 may then wait for the trigger signal from the camera 105 and then abruptly change the state of the carrier. This change of state may either stop the state of the transmission, in OOK/ASK mode, or transitions the state of the transmission to vary the frequency, in FSK mode. This results in a trigger instruction being processed by the receiver 120 in less than about 10 microseconds from the trigger instruction by the camera 105, thus resulting in a very near real time activation signal.

In accordance with an exemplary embodiment and using this method, additional "conversations" may be observed by factory testing and added to the devices to, for example, activate the flash with other settings such as commands for the use of groups for ratios, multi-modes, and high speed sync modes.

In accordance with an exemplary embodiment, is should be appreciated that generally, only one side of each conversation may be recorded, i.e. the communication from the camera to the flash, and the response communication from the flash to the camera. For example, if the transmitter 110 always instructs the camera it may be a 550EX flash, and the receiver 120 always instructs the coupled flash that it may be a 1DMkII camera, then each camera and flash will respond appropriately. Thus, the transmitter 110 may be placed on a model 20D camera and the receiver 120 may be placed on a model 580EX11 flash and both devices will continue to work together.

Figure 6:
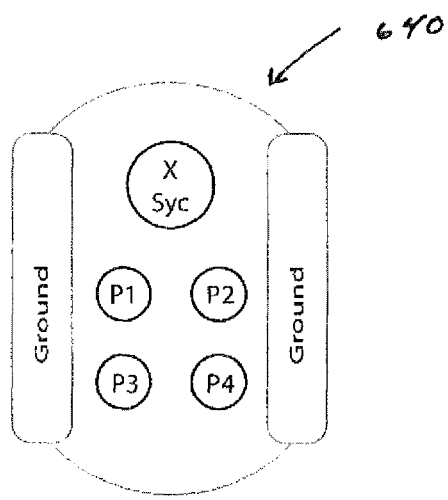
FIG. 6 representatively illustrates a schematic of an exemplary serial connector of a camera.

Generally, a flash device, such as the flash device 115 may be coupled to the hot shoe of a camera, for example the camera 105, with direct electrical contacts between the 5 pins plus a common ground. The pins, for example the pins shown in FIG. 6 of hot shoe 640, may comprise of: a clock generated by the camera 105, a data-out from the camera 105 to the flash device 115, a data-in which may be used for data from the flash device 115 back to the camera 105, as well as a proprietary pin. The proprietary pin may be used by the camera 105 to essentially instruct the attached flash device 115 to be "awake," etc.

Figure 9:
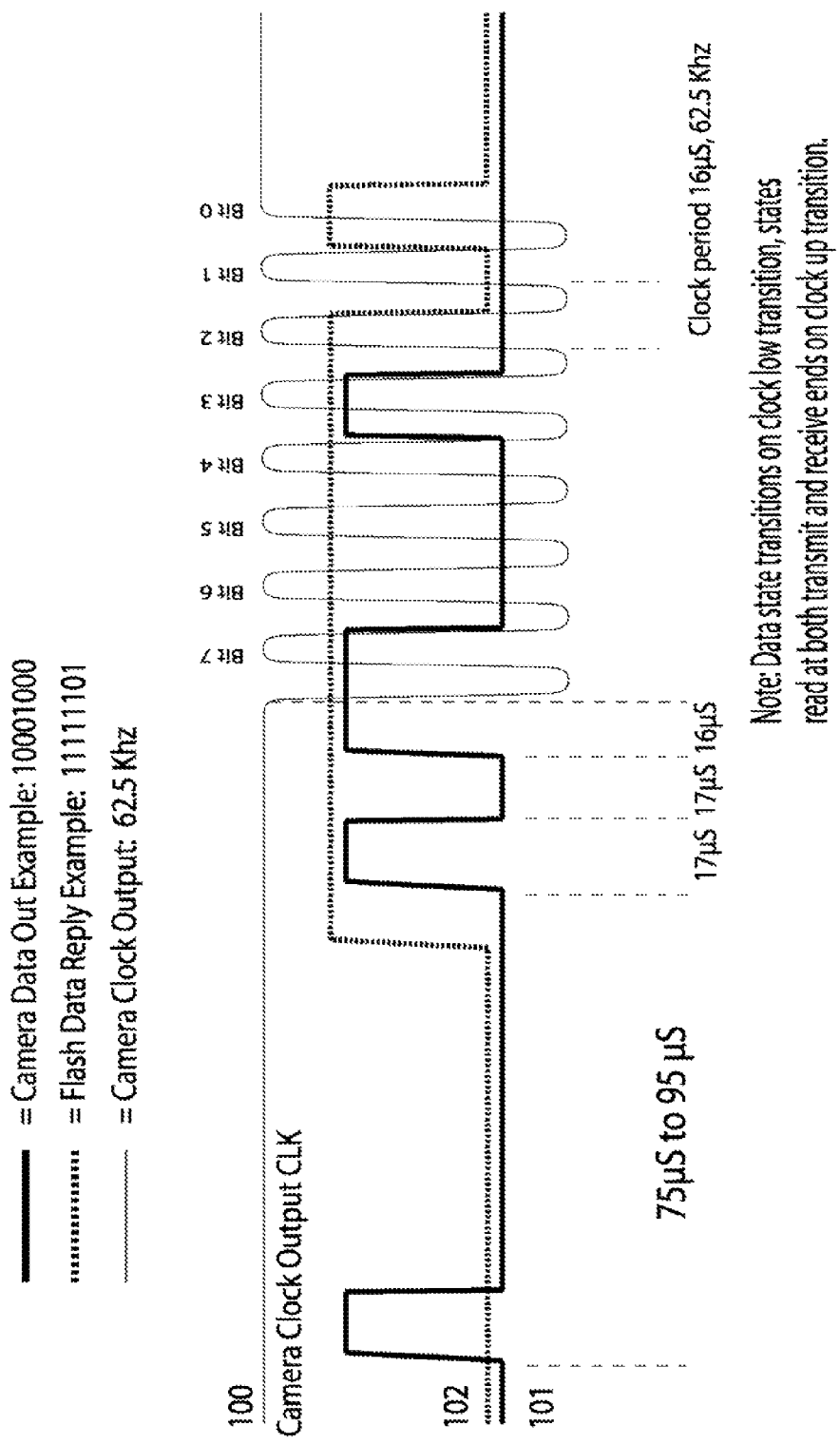
FIG. 9 representatively illustrates an exemplary data byte format diagram showing how the camera forms a proprietary synchronous serial data communication with the flash device.

The camera 105 may form a proprietary synchronous serial data communication with the flash device 115 by sending packets of 8 bit bytes along with a clock signal, as shown by FIG. 9. In accordance with the present invention, it may be desirable to split this physical electrical connection and replace it with a radio link, but because it takes a certain amount of time to build, transmit, and demodulate radio packets, simply reading the broadcasting data may not work for reasons already discussed. Thus, to effectuate effective communication, a pseudo communication is prescribed. For example, it is desirable for a user's camera, such as the camera 105 to observe that the transmitter device 120 may actually be a flash device, such as the flash device 115, by mimicking the flash device's communication responses. On the receiving end, it is desirable that the remote flash device 115 observe that it may be coupled to the user's camera when in fact it will actually be coupled to the receiver 120, thus the receiver 120 will mimic the commands that normally originate from the camera 105 to consequently actuate the flash device 115 in a manner that is desired.

In accordance with an exemplary embodiment, the typical conversation between a camera and a directly coupled flash device may comprise the following:

Byte Format: The format of an exemplary byte of data within a packet may be shown by FIG. 9. The camera, such as the camera 105 may hold its CLK pin high, and when it has a byte of data to exchange with a flash, such as the flash device 115, the camera 105 may create an indicator on the data-out line, for example about every 75 to 95 microseconds. When the flash device 115 may be ready to receive communication and/or data, the flash device 115 may raise its data pin high. The camera data pin may show a mark at about 17 microseconds ("µS") followed by about a 17 µS gap, then goes high to initiate the byte. The clock, driven by the camera 105, may begin to then control the exchange. The pins, both camera data and flash response data, may transition on the clock downward transition, and both data lines may be read at both ends when the clock goes back high. The clock may be about 62.5 Khz, but other frequencies may be used, when present, with a period of about 16 µS. If the last bit comprises a "1", a high for example, it may be held high for about 10 µS following the last rise of the clock, then both camera data-out and the flash reply data lines go low while the clock remains high.

When these two lines interface, one in and one out, this may allow for simultaneous synchronous communication, e.g. the sending device of the camera 105 for example, may be expecting to receive a byte of information in exchange at the same time it is sending a byte of information.

It should be noted that data packets may comprise of multiple bytes, wherein each byte may take about 180 µS to pass, and there may be a typical space of about 150 µS between bytes, however these time periods may be longer or shorter. The conversation between a camera and a flash device directly coupled to the hot shoe generally comprises a few main parts, which may be easily observed by watching the interface pins on an oscilloscope. As described below, some of the typical conversations may comprise handshakes, steady state, pre-flash, main flash, and the like conversations.

Handshake: When a shutter button on the camera may be pressed half way, the camera 105 may communicate with the flash device 115 to effectuate a "handshake" FIG. 10, parts A, B, C, D, during which a packet of four bytes, followed by ten bytes, as shown by FIG. 13, may be exchanged.

Steady State: At about 50 millisecond intervals, a data packet of 32 bytes may be exchanged. This data packet appears to include various configuration information such as the camera's f/stop, focal length of the lens, and so on. Some flash devices may use this information to zoom the focus of the light emission beam as well as update the user display on the flash device 115 with useful range information about the current f/stop and so on. The flash device 115 may reply synchronously to this with simple repetitive bytes which may be essentially acknowledgments. Some of these bytes from the flash device 115 to the camera 105 may include user settings on the flash device 115 such as commanded flash exposure compensation, etc. This exchange occurring at about 50 milliseconds intervals or so basically refreshes the settings to the flash device 115 from camera 105 and to the camera 105 from the flash device 115.

If no buttons may be pressed, the ½ pressed shutter may be released, or otherwise no photograph may be taken for a period of a few seconds following the handshake, the camera 105 may then go silent by lowering its clock pin and data-out pins back to ground, shortly after which time the flash device 115 display may go dark and the flash device 115 may "sleep" to conserve battery power.

Figure 11:
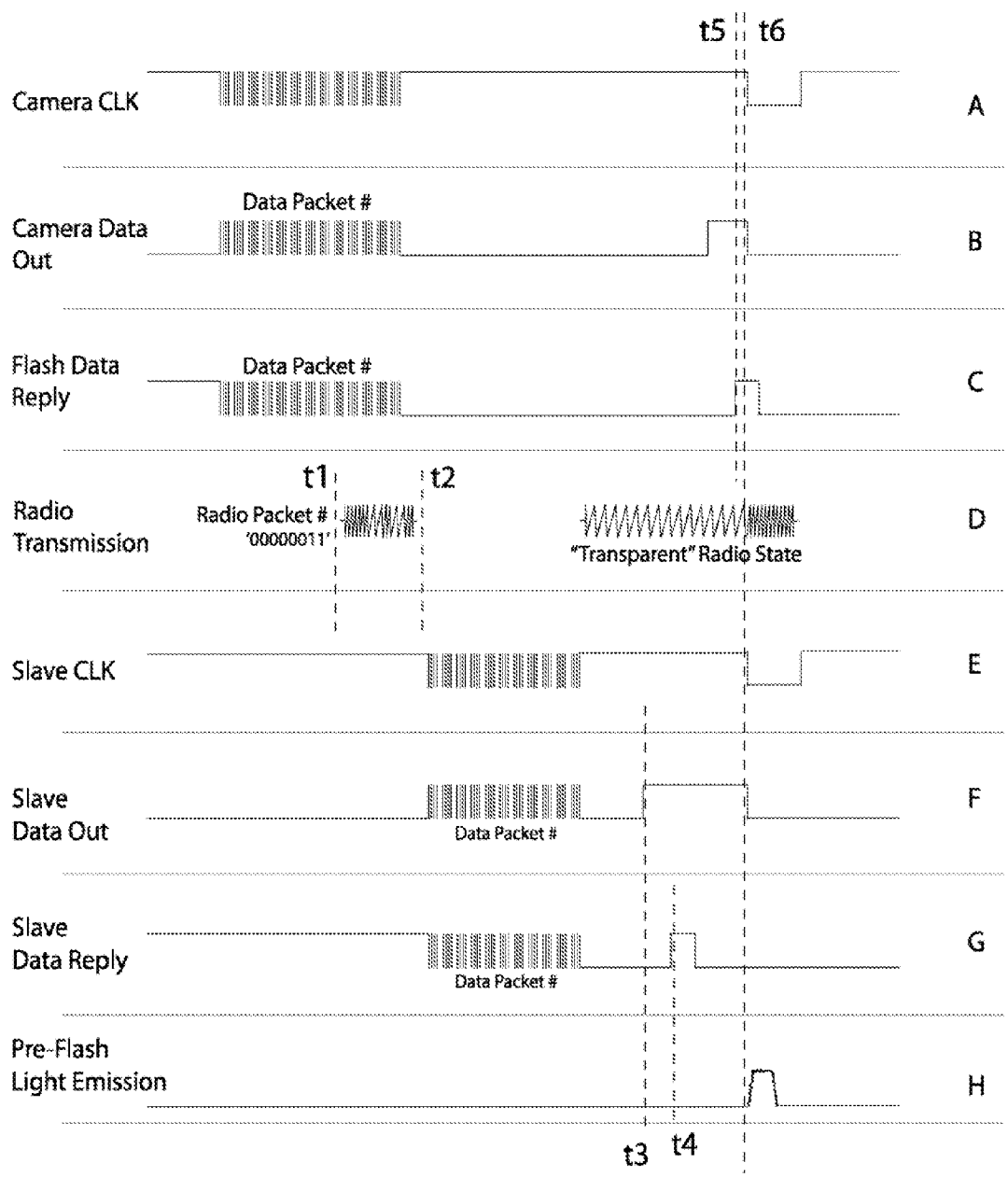
FIG. 11 representatively illustrates an exemplary pre-flash communication between the camera and the flash device.

Pre-Flash: When the abutter button may be pressed all the way, the camera 105 may order the flash device 115 to emit a "pre-flash" of a known amount of light which the camera's metering system will eventually measure and use as a basis to calculate prescribed light emission during the taking of the actual photograph. When this pre-flash may be ordered, 13 bytes may be sent, as shown in FIG. 15, which instructs the flash device 115 to prepare to emit this pre-flash. The flash device 115 responds with an acknowledgment. The actual pre-flash event occurs as shown in FIG. 11. The flash device 115 instructs the camera 105 that it may be ready to emit a pre-flash by raising its data out to a high suite, and the camera 105 orders the actual emission of the pre-flash by dropping its clock pin low.

Main Flash: The camera 105 may order the main flash with a 23 byte packet, as shown by FIG. 16. Byte 9 may be of particular interest as it represents the ordered power to which the flash device 115 should emit light. The actual power, on an f-stop scale, is represented by a specific byte. The flash device 115 again indicates it may be ready to fire by moving its data output pin high. The camera 105 opens the shutter, drops its clock pin low as a final preparatory signal, and finally causes the actual firing of the flash device 115 at the prescribed intensity by pulling the X-sync pin low.

In accordance with an exemplary embodiment, a binary value between 128 and 255 may represent the possible steps of light emission ranging from max power to minimum power. In an embodiment the 255 commands may be divided as follows: 1) a binary value of 128 to 255 may be used to directly indicate an instruction to fire a main flash, and the binary value corresponds to the output power of that flash; and 2) some commands may be reserved to indicate specific "conversations" the camera 105 may have with the flash device in a way similar to the pre-flash example above.

Specific conversations may be the handshake/startup, the steady-state, the order for a pre-flash, and the order for a main flash. Since the order for the main flash may be indicated by a 128 to 255 noted above, only three main commands may be indicated. Moreover, a given operating software may interface with several models of flash devices on the receiving end that may have slightly different conversations, for example Canon brand flash devices, models 550Ex, 580Ex, and 580EX11 may all comprise different handshake or steady state conversations. As such, about twenty instructions may be allotted for each model of flash device. The example above, comprising the exemplary Canon brand 550Ex as mentioned, may use three such instructions, but future functions may be added, such as a special function to instruct the flash device to fire in High Speed Sync mode, or to operate based upon a certain ratio group. Thus, the unused instructions may be used by future software updates. Given twenty instructions for each model, comprising five models of flash for a given companies current offerings of flash units, thus, commands 1 through 99 may be used to key certain conversations with a variety of flash units. The remaining keyed commands, 100 through 127, may be reserved and used for control instructions for the receiver to perform internal functions not directly related to the attached hardware.

For example, the control instructions may tell the receiver 120 to switch the coded channel it may be listening for, to change its operating frequency, or to blink its indicator lights. Thus, a test broadcast may be sending the byte "120" by the transmitter 110, which may be keyed to instruct the receiver 120 to blink its indicator lights a few times to indicate it may be within range. Then byte "121" may instruct the receiver to read the received signal strength indicator ("RSSI") off the byte and strobe its indicator lights fast for higher RSSI, and slower for lower RSSI. Thus, when the receiver 120 may be, for example up in a balcony out of reach, the photographer on a ground floor may visually recognize how strong the radio signal may be and so forth.

In accordance with an exemplary embodiment, the following may comprise an exemplary operation of the present invention. In an exemplary embodiment, a Canon brand 1DMkII model camera may be comprise an exemplary camera, and a Canon brand SpeedLite 550EX model flash may comprise an exemplary flash device. However, the present invention may comprise various brands and models of cameras and flash devices.

In accordance with an exemplary embodiment, a "Transmitter Power On" procedure 2200 is shown by the flow chart of FIG. 22. When a user powers on the transmitter 110, the MCU 864 will block all inputs and hold for ICSP to take over for programming (2210), after the delay registers and peripherals may be configured for use (2220). A user interface may be entered (2215) to select an operating program, or a default program may start on its own; this data may be referenced from last use from EEPROM (2230). The particular program may be started (2240). The radio module may be configured (2250) using the SPI interlace per the CC1100 data sheet (2260), and the second SPI interface to connect to the camera 105 may be configured (2270). The display may be updated with the current program name for the user (2280).

The transmitter 110 may then enter a main murine 2300 (2305-2380) waiting for user action (2310), or the camera 105 to come to life and begin a communication, indicated by the camera's CLK pin going high and causing an interrupt in the MCU 864 of the transmitter 110.

When the receiver 120 may be powered on a similar selection of operating program may be made (2810-2880), we'll assume the proper program to receive the communication may be selected. The receiver configures its radio receiver to receive mode and sets register values in a similar way to the transmitter process per FIG. 28 "Receiver Power On Startup" (2810-2880). The receiver then enters a main routine FIG. 29 (2905-2950) where it waits for a user interaction (2910) or an incoming data packet from the radio (2920).

Figure 10:
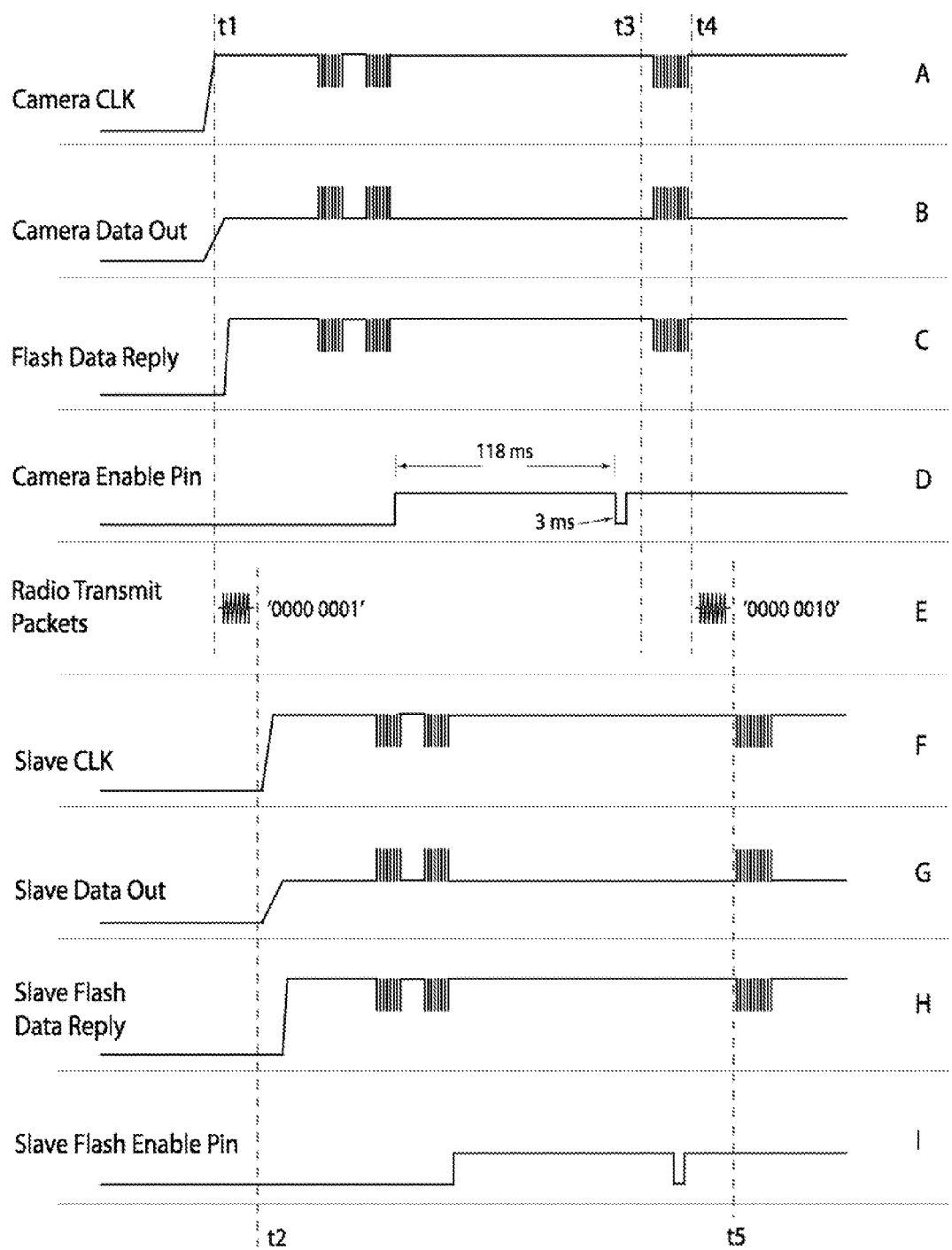
FIG. 10 representatively illustrates an exemplary startup communication between the camera and the flash device.

When the camera 105 may be activated by the user pressing a button (or half pressing the shutter on the camera 105) the camera 105 may begin a handshake operation with the attached transmitter 110, i.e. the "Startup Communication," FIG. 10 illustrates the corresponding wave forms. The clock goes high and the transmitter 110 may prepare to respond to the camera 105 as if it were a 550Ex camera flash device 115. The data of the communication may comprise that of FIG. 13.

As any initial start to a conversation may begin with the camera clock going high, a few bytes of data, and the enable pin showing a specific wave form, as shown in FIG. 10, parts A, B, C, D, does not have to wait for the data to actually come across from the camera 105 for the receiver to "wake up" and begin hand shaking with a coupled camera flash device. Once the transmitter 110 recognizes the clock go high from the camera 105, it may send the "initiate handshake" command to the radio module that may comprise an integer "1" in binary code. The actual byte to be transmitted by the radio may be '00000001'. This may occur, for example, at time (t1) of FIG. 10.

When the receiver 120 receives the data packet, it looks up the command "1" to recognize the reference to a block of code that causes it to begin communicating via the serial interface with the coupled flash device to transition its own CLK pin high, and perform the hand shake operation with the flash device 115 as if it were a camera 105. Thus at time (t2) of FIG. 10, a delay comprising a time period to build and send the radio transmit packet instructs the receiving flash device 115 to become active and start communicating with the receiver 120 as if it were a camera 105.

A "CamComm" flag may be set in software of an MCU that indicates an active communication state. This flag may be referenced by functions in the software to recognize if a communication may be active or not. Similarly an "Active-Com" flag may be set in the receiver MCU. The receiver 120 may set a timer for 200 milliseconds that when timed out, indicates the camera 105 may be no longer actively communicating. Thus, a radio packet to denote the end or timeout of a communication may not be sent because the timeout can occur automatically when the timer expires. The timer may be reset with each incoming radio data packet that represents serial data between the camera 105 and the flash device 115.

After the camera 105 dips its enable pin low then back up, the handshake may be complete. The transmitter 110 may then enter an active CamComm routine, FIG. 24 (2410-2494) in which the transmitter 110 may monitor the serial interface for packets of data from the camera 105, and the receiver 120 may enter its own ActiveComm startup where the receiver 120 may await additional radio packets or the expiration of the timeout timer, FIG. 31 (3105-3180).

When the transmitter 110 recognizes a data packet with a 2nd byte matching that of a known steady state data packet, for example as shown in FIG. 14, the second byte "B2" from the "Cam Send," e.g. byte '1011 0101' the transmitter 110 may instruct the receiver 120 to play the already known and predictable steady-state communication for the slave flash device 115. Here, the transmitter 110 may merely transmit the integer command '2' by radio using the 8 bit packet; the actual binary packet sent may be '0000 0010' as shown in FIG. 20. This may occur at about time (t4) of FIG. 10 and cause the communication as shown in FIG. 14 to occur between the receiver 120 and the flash device 115.

This "steady state" operation may occur many times, generally about every 50 milliseconds for a few seconds until the camera 105 lowers its clock pin and terminates communicating, since the user hasn't pressed any more buttons. Here, no further steady state updates may be sent, and the timer TIMER 1 eventually times out in the receiver 120, causing it to discontinue its serial communication with the coupled flash device 115 and resume its main routine.

In accordance with an exemplary embodiment, the user may fully press the shutter button on the camera 105, causing the picture taking and lighting process to begin. First, the transmitter 110 may receive a handshake from the camera 105, if a handshake has not occurred recently and the clock pin has returned to low, or if the communication was already active comprising the periodic steady state communications. In an embodiment, a radio transmit packet may be sent from the camera 105 to the transmitter 110 via the serial interface indicating an instruction to carry out a pre-flash operation, wherein in this instance, byte 2 of the radio transmit packet will equal '1011 0100', an indication of a pre-flash communication as shown by FIG. 15. For the pie-flash, the communication exchange as shown by FIG. 11 may begin to take place. Once enough bytes have been received from the camera 105 by the transmitter 110 to confirm a pre-flash is ordered, the transmitter 110 may send a data packet that corresponds, as shown by FIG. 20, to the "Order Pre-Flash" event. In this instance, integer "3", an actual data byte of '0000 0011' may be sent by the radio at time (t1) as show in FIG. 11. It should be noted that the radio packet may be sent before the entire data, exchange between the camera 105 and the transmitter 110 has been completed.

Next, the receiver 120 may recognize the incoming data packet, and when demodulated and referenced as command "3" this may in turn be referenced to determine an "Order a Pre-Flash" instruction was sent. The receiver 120 then begins to play the data as shown by FIG. 18 for the coupled flash device, thus, impersonating a camera 105 ordering a pre-flash.

Once the radio packet has been sent, the radio enters a transparent mode which bypasses the radio packet processing logic and allows the process to mark an exact point in time of which the pre flash event should take place as indicated by the users camera 105 transitioning its own CLK pin low.

On the receiving side, the radio may be set to view transparent data. This constant carrier way be monitored for an indication of what may be to mark the exact time the pre flash should be emitted. When the radio carrier may be observed to change at time (t6) as shown by FIG. 11, the receiver 120 may transition its own CLK out pin low, causing the flash device 115, now prepared by the data communication as shown by FIG. 20 to emit a pre-flash in sync with the time the camera's metering system may be expecting to recognize the pre-flash light.

Next, the transmitter 110 may return to observing for another serial data packet to be produced by the camera 105, while the receiver returns to waiting for its TIMER 1 to time out or another radio command to be received.

The user's camera 105 at this point will have metered the known light value emitted from the pre-flash, and depending on the scene desired to be imaged and the camera 105's controls, the camera 105 will calculate the proper amount of light that will be required from the flash device 115 to reach a proper exposure.

Figure 12:
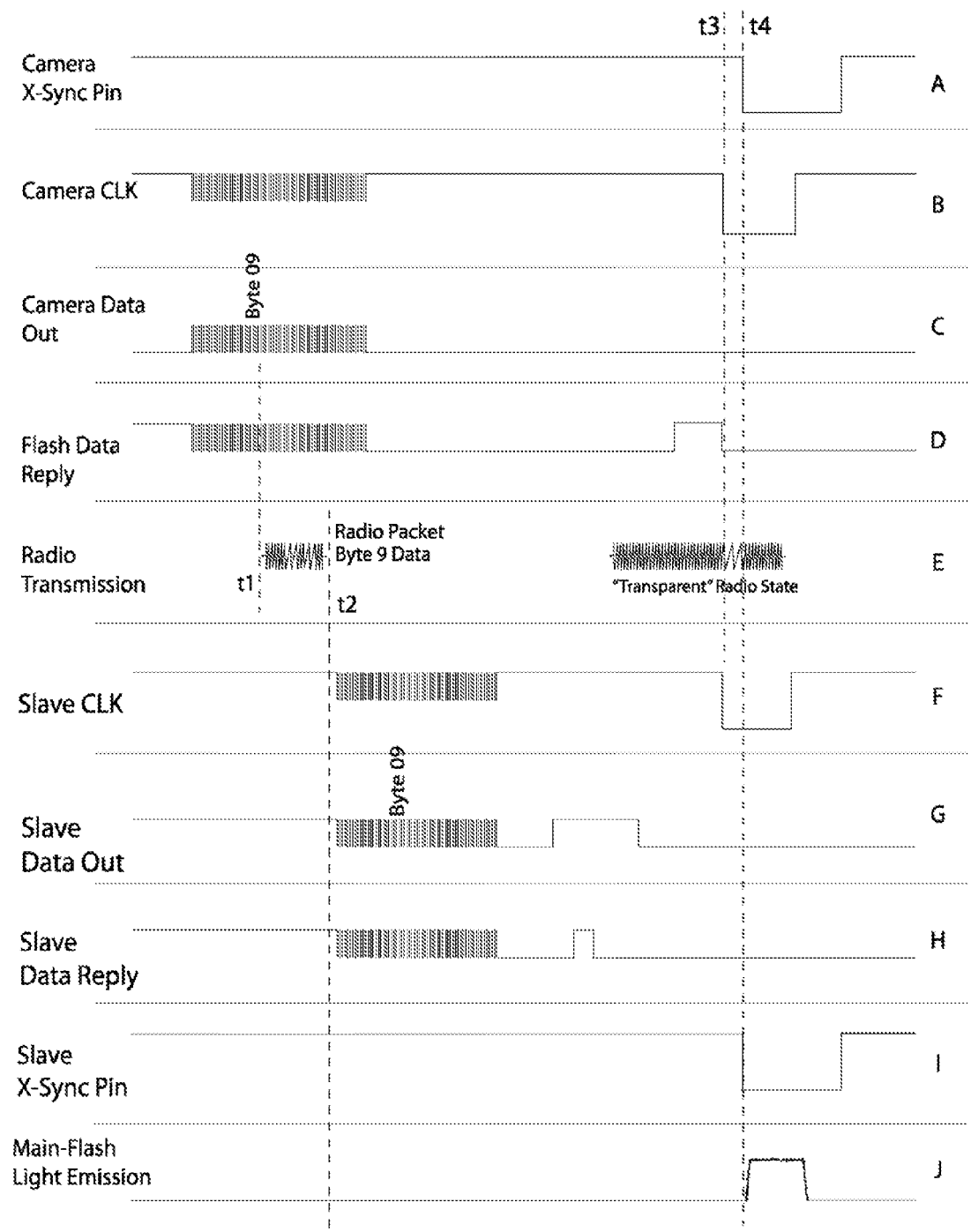
FIG. 12 representatively illustrates an exemplary main flash communication between the camera and the flash device.

The camera 105 next initiates another communication with the transmitter 110 and data communications as shown by FIGS. 12 and 19 construct the main light emission during the time the camera shutter may be open.

The camera 105 will issue the data communication, FIG. 16 to the transmitter 110. The byte 9 of which may be an 8-bit value pertaining to the amount of light the flash unit should emit when it fires.

The communication as shown by FIG. 16 may be consistent except for byte 9 which may represent the emission amount. Once the communication reaches byte 2, it may be known that this byte packet represents a command for main light emission. The program of the transmitter 110 then comprises the conversation as per FIG. 16 and waits for byte 9 to come across.

As soon as byte 9 may be read by the transmitter 110 at time (t1) of FIG. 12, the transmitter 110 will order the radio to send, this byte, byte 9 as received by the radio. This byte being outside the range of 1 to 127 as shown by FIG. 20, the receiver 120 will recognize this byte represents both an instruction to fire a main flash and also the actual integer number (128 to 255), which corresponds to the actual amount of light to emit by the flash device 115 during main light emission.

In an embodiment, the flash device may not comprise an amount of light to emit, but when the communication between the receiver 120 and tire flash device 115 may be reconstructed, the bits of received byte 9 may be inserted into the communication in place of the byte 9 value.

At time (t1) of FIG. 12, merely after byte 9 may be sent from the camera 105 to the transmitter 110, that byte 9 may be sent by radio packet. At time (t2), which may be still before the completion of the serial communication on the transmitter 110 side, the radio packet arrives at the receiver 120.

In accordance with an exemplary embodiment, the communication of FIG. 12, parts F, G, H may be played from the receiver 120 to the coupled flash device 115, by inserting the byte 9 bits where appropriate. The flash device 115 then may function as if the communication may be by a directly coupled camera 105 that commands the flash device 115 to emit a main flash, having an instruction of the output power from byte 9 which now matches exactly the output power ordered by the originating camera's light meter system, as shown by FIG. 12 part C at time (t1).

The transmitter 110 may then command the radio module to enter transparent mode, and the MCU may provide a constant state to an I/O pin on the radio module to hold a constant state. The trigger instruction for the main flash in synchronization with the operation of the camera's shutter may be a two stage process, the first being time (t3), FIG. 12, when the camera's clock goes low, and the second being time (t4), FIG. 12, where the camera's X-sync connector goes low, thereby triggering what should be the actual emission of the camera flash device 115.

The radio using this transparent constant carrier method marks both first and second stage events by first transitioning the carrier low at time (t3) to which the receiver 120 responds by transitioning its own clock low in very near real time, and the second stage by transitioning the constant carrier back high, marking the time when the camera's X-sync goes low. The carrier transitioning back high may be observed by the receiver MCU 864 (by observing the transparent data output pin of the radio module), to which it responds by transitioning its own X-sync line low, Part H of FIG. 12, in very near real time synchronization with time (t4), thereby causing actual light emission of the flash device 115 at the time the camera's shutter may be open.

The pins involved may transition back to pre-emission states and both the transmitter 110 and the receiver 120 may resume active comm states to await either a timeout or another packet of data to act upon.

It should be noted that the data communication of FIG. 15, the pre-flash command data on the transmitter 110 side, may be somewhat different from the communication of FIG. 18, the pre-flash command data on the receive side. This may be because the transmit side may be operating in what mimics the flash device 115 in "master" mode thereby providing a couple extra bytes of data, while the receive side may be operating in regular "wireless OFF" mode, which has a slightly shorter communication, as there may be no possibility of the existing flash system of using groups B and C for ratios when connected directly to the camera 105 with wireless operation turned off. Though with the present invention it may be possible to still effect groups with the correct formatting of the communication.

In a similar way, the main flash data communications, FIG. 16 on the transmit side and FIG. 19 on the receive side, may be slightly different. Two extra bytes, for example, bytes B10 and B11 may be provided on the transmit side, which may correspond to command the coupled flash device 115 may normally blink by its xenon tube to effect wireless communication to additional flash groups. Here, no extra groups may be used, so these bytes may be both "0", and for the same reasons as the pre-flash, these bytes may not be included on the receive side.

In accordance with various exemplary embodiments, in conjunction with the descriptions of the transmitter, the receiver, the camera, and/or the flash device as well as their operations, FIG. 25 illustrates an exemplary transmitter flash routine flow chart (2510-2590); FIG. 26 illustrates an exemplary transmitter main flash routine (260-2660); and FIG. 27 illustrate an exemplary unknown data routine (2710-2720). Moreover, FIG. 30 illustrates an exemplary receiver "Active-Com" startup routine (3005-3060); FIG. 32 illustrates an exemplary receiver steady state routine (3210-3220); FIG. 33 receiver illustrates an exemplary receiver pre-flash routine (3310-3395); and FIG. 34 illustrates an exemplary receiver main flash routine (3405-3460). Each of the flow charts comprises exemplary steps to carry out the various methods and operate the various systems described.

In accordance with various embodiments, this disclosure describes a basic operation regarding the activation of a single remote camera flash device in a typical ETTL, ittL, etc. operating mode. Such remote camera flash devices may also be capable of radio flash emission among different groups. The commands to coordinate, multiple group radio operation may be very similar to the commands for a single remote camera flash device, except the logic, as shown by FIGS. 11 and 12, may be expanded to essentially provide for the described communication in multiple instances instead of once, i.e., one for each flash group.

In the foregoing specification, the invention has been described with reference to specific exemplary embodiments. Various modifications and changes may be made, however, without departing from the scope of the present invention as set forth in the claims. The specification and figures may be illustrative, rather than restrictive, and modifications may be intended to be included within the scope of the present invention. Accordingly, the scope of the invention should be determined by the claims and their legal equivalents rather than by merely the examples described.

For example, the steps recited in any method or process claims may be executed in any order and may be not limited to the specific order presented in the claims. Additionally, the components and/or elements recited in any apparatus claims may be assembled or otherwise operationally configured in a variety of permutations and may be accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced may be not to be construed as critical, required or essential features or components of any or all the claims.

As used herein, the terms "comprise", "comprises" "comprising", "have", "has", "having", "including", "includes", "employs", "employing" or any variation thereof, may be intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What may be claimed may be:

1. A system to wirelessly actuate a remote camera flash device comprising:
   a first radio communication device coupled to a camera; and
   at least a second radio communication device coupled to the remote camera flash device,
   wherein, the first radio communication device transmits at least one radio signal to the second radio communication device in response to receiving camera communications sent from the camera;

wherein the second radio communication device sends pseudo camera communications to the remote camera flash device in response to receiving the at least one radio signal; and wherein the second radio communication device does not transmit a radio signal.

2. The system of claim 1, wherein the first radio communication device comprises pseudo flash communications to send back to the camera, which are substantially similar to flash communications that the remote camera flash device comprises and sends back to the at least second radio communication device.

3. The system of claim 2, wherein the pseudo camera communications sent to the remote camera flash device are substantially similar to the camera communications that the camera sends to the first radio communication device.

4. The system of claim 3, wherein the camera communications comprise of a plurality of unique data streams, wherein each of the plurality of unique data streams comprises a data packet, wherein each data packet comprises a plurality of electronic bytes.

5. The system of claim 4, wherein the plurality of electronic bytes are separated by time gaps.

6. The system of claim 5, wherein the first radio communication device identifies what type of the at least one radio signal to transmit to the at least second radio communication device by an identifiable byte from the plurality of electronic bytes in the data packet.

7. The system of claim 6, wherein the identified radio signal is transmitted to the at least second radio communication device during at least one of the time gaps.

8. The system of claim 6, wherein the first radio communication device sends a unique pseudo flash communication from the pseudo flash communications back to the camera, wherein the unique pseudo flash communication corresponds to a unique camera communication from the camera communications.

9. The system of claim 8, wherein the remote camera flash device sends a unique flash communication from the flash communications back to the at least second radio communication device, wherein the unique flash communication corresponds to the unique camera communication.

10. The system of claim 1, wherein the first radio communication device comprises a radio transmitter and the at least second radio communication device comprises a radio receiver.

11. A method to wirelessly actuate a remote flash device comprising:

coupling a first radio communication device to a camera that is configured to produce a plurality of unique camera communications, each consisting of a unique sequence of data bytes;

coupling a second radio communication device to the remote flash device;

receiving, by the first radio communication device, data bytes produced by the camera as part of a unique camera communication;

identifying the unique camera communication based on the received data bytes before the first radio communication device has received the entire camera communication;

mimicking an electronic flash response from the first radio communication device to the camera based upon the identification of the camera communication;

transmitting a radio signal from the first radio communication device to the second radio communication device based upon the identified camera communication; and mimicking the identified camera communication to the remote flash device by the second radio communication device.

12. The method of claim 11, further comprising transmitting the radio signal before the first radio communication device has received the entire camera communication.

13. The method of claim 12, further comprising transmitting the radio signal during a time gap between a plurality of data bytes of the camera communication.

14. The method of claim 12, further comprising identifying a particular data byte among the plurality of data bytes as the basis for transmitting the radio signal.

15. The method of claim 14, wherein when identifying the particular data byte comprises identifying the data byte that corresponds to a flash command, the first radio communication device transmits the data byte that corresponds to the flash command to the second radio communication device; and wherein when a data byte that corresponds to a flash command is not identified, the first radio communication device transmits a signal representative of the identified camera communication.

16. A method to simulate two-way serial communication between a camera and a flash device coupled to the camera comprising:

coupling a radio transmitter having a first microprocessor to the camera;

coupling a radio receiver having a second microprocessor to the flash device;

receiving a first serial communication by the radio transmitter sent from the camera;

transmitting an index signal from the radio transmitter to the radio receiver based upon the first serial communication, wherein the index signal consists of a data sequence representative of the first serial communication, and wherein the data sequence of the index signal is shorter than that of the first serial communication; and sending a second serial communication to the flash device from the radio receiver that is substantially similar to the first serial communication.

17. The method of claim 16, wherein the first microprocessor:

identifies the first serial communication by a byte from among a plurality of bytes that comprises the first serial communication;

provides a response back to the camera based upon the identified first serial communication; and provides the index signal based upon the identified first serial communication.

18. The method of claim 17, wherein the second microprocessor sends the second serial communication based upon the received index signal and receives a third serial communication back from the flash device based upon the sent second serial communication.

19. The method of claim 17, wherein when the first microprocessor identifies the byte from the first serial communication that corresponds to a flash command, the transmitted index signal consists of the byte that corresponds to the flash command.

20. The method of claim 18, wherein the response provided back to the camera is substantially similar to the third serial communication.

* * * * *